United States Patent
Kim et al.

(10) Patent No.: US 9,395,583 B2
(45) Date of Patent: Jul. 19, 2016

(54) COLUMN SPACER DESIGN FOR A DISPLAY INCORPORATING A THIRD METAL LAYER

(75) Inventors: Kyung-Wook Kim, Cupertino, CA (US); Shih Chang Chang, Cupertino, CA (US); Cheng Chen, San Jose, CA (US); Young-Bae Park, San Jose, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/605,918

(22) Filed: Sep. 6, 2012

(65) Prior Publication Data

US 2013/0329150 A1  Dec. 12, 2013

Related U.S. Application Data

(60) Provisional application No. 61/656,476, filed on Jun. 6, 2012.

(51) Int. Cl.
  *G02F 1/1339* (2006.01)
  *G02F 1/1333* (2006.01)
  *G02F 1/1343* (2006.01)

(52) U.S. Cl.
  CPC ........ *G02F 1/13394* (2013.01); *G02F 1/13338* (2013.01); *G02F 1/134363* (2013.01); *G02F 2001/13396* (2013.01); *G02F 2001/134372* (2013.01)

(58) Field of Classification Search
  CPC .................. G02F 1/13394; G02F 1/134363
  USPC .......................................... 349/156
  See application file for complete search history.

(56) References Cited

U.S. PATENT DOCUMENTS

| 4,542,960 | A |   | 9/1985  | Yang               |         |
|-----------|---|---|---------|--------------------|---------|
| 4,916,308 | A |   | 4/1990  | Meadows            |         |
| 5,105,186 | A |   | 4/1992  | May                |         |
| 5,483,261 | A |   | 1/1996  | Yasutake           |         |
| 5,488,204 | A |   | 1/1996  | Mead et al.        |         |
| 5,550,659 | A |   | 8/1996  | Fujieda et al.     |         |
| 5,680,187 | A | * | 10/1997 | Nagayama et al.    | 349/110 |
| 5,825,352 | A |   | 10/1998 | Bisset et al.      |         |

(Continued)

FOREIGN PATENT DOCUMENTS

| CN | 102193253 A | 9/2011 |
|----|-------------|--------|
| CN | 103488332 A | 1/2014 |

(Continued)

OTHER PUBLICATIONS

Non-Final Office Action mailed Oct. 23, 2013, for U.S. Appl. No. 12/315,869, filed Dec. 5, 2008, six pages.

(Continued)

*Primary Examiner* — James Dudek
(74) *Attorney, Agent, or Firm* — Morrison & Foerster LLP

(57) ABSTRACT

A display that contains a column spacer arrangement which takes advantage of a protrusion on a TFT substrate is provided. One set of column spacers is disposed on top of the protrusion, while a second set of column spacers of substantially the same height as the first set of column spacers are disposed throughout the display. In this way, the display is adequately protected against deformation from external forces while at the same maintaining enough room to allow for a liquid crystal to spread out during the manufacturing process.

17 Claims, 18 Drawing Sheets

(56) References Cited

U.S. PATENT DOCUMENTS

| | | | |
|---|---|---|---|
| 5,835,079 A | 11/1998 | Shieh | |
| 5,838,308 A | 11/1998 | Knapp et al. | |
| 5,844,644 A | 12/1998 | Oh et al. | |
| 5,880,411 A | 3/1999 | Gillespie et al. | |
| 6,057,903 A | 5/2000 | Colgan et al. | |
| 6,177,918 B1 | 1/2001 | Colgan et al. | |
| 6,188,391 B1 | 2/2001 | Seely et al. | |
| 6,204,897 B1 | 3/2001 | Colgan et al. | |
| 6,281,957 B1 | 8/2001 | Oh et al. | |
| 6,310,610 B1 | 10/2001 | Beaton et al. | |
| 6,323,846 B1 | 11/2001 | Westerman et al. | |
| 6,483,498 B1 | 11/2002 | Colgan et al. | |
| 6,501,529 B1 | 12/2002 | Kurihara et al. | |
| 6,549,260 B1 * | 4/2003 | Shibahara | G02F 1/134363 349/141 |
| 6,556,265 B1 | 4/2003 | Murade | |
| 6,646,706 B2 | 11/2003 | Lim et al. | |
| 6,646,707 B2 | 11/2003 | Noh et al. | |
| 6,680,448 B2 | 1/2004 | Kawashima et al. | |
| 6,690,387 B2 | 2/2004 | Zimmerman et al. | |
| 6,762,815 B2 | 7/2004 | Lee | |
| 6,975,379 B2 * | 12/2005 | Kim et al. | 349/155 |
| 7,015,894 B2 | 3/2006 | Morohoshi | |
| 7,042,444 B2 | 5/2006 | Cok | |
| 7,133,032 B2 | 11/2006 | Cok | |
| 7,184,064 B2 | 2/2007 | Zimmerman et al. | |
| 7,202,856 B2 | 4/2007 | Cok | |
| 7,230,608 B2 | 6/2007 | Cok | |
| 7,280,167 B2 | 10/2007 | Choi et al. | |
| 7,379,054 B2 | 5/2008 | Lee | |
| 7,633,595 B2 * | 12/2009 | Kim et al. | 349/156 |
| 7,663,607 B2 | 2/2010 | Hotelling et al. | |
| 7,969,546 B2 * | 6/2011 | Wu et al. | 349/156 |
| 8,144,295 B2 | 3/2012 | Chang et al. | |
| 8,169,421 B2 | 5/2012 | Wright et al. | |
| 8,294,865 B2 | 10/2012 | Chang et al. | |
| 8,330,930 B2 * | 12/2012 | Matsumori | G02F 1/13394 349/123 |
| 8,350,826 B2 | 1/2013 | Watanabe | |
| 8,479,122 B2 | 7/2013 | Hotelling et al. | |
| 8,497,967 B2 | 7/2013 | Chang et al. | |
| 8,749,496 B2 | 6/2014 | Chang et al. | |
| 8,866,787 B2 | 10/2014 | Chang et al. | |
| 2001/0013915 A1 | 8/2001 | Song | |
| 2001/0020578 A1 | 9/2001 | Baier | |
| 2001/0026347 A1 * | 10/2001 | Sawasaki et al. | 349/156 |
| 2002/0084992 A1 | 7/2002 | Agnew | |
| 2002/0159016 A1 | 10/2002 | Nishida et al. | |
| 2004/0109097 A1 | 6/2004 | Mai | |
| 2004/0114082 A1 | 6/2004 | Lee | |
| 2004/0120200 A1 | 6/2004 | Gogl et al. | |
| 2004/0141096 A1 | 7/2004 | Mai | |
| 2004/0189587 A1 | 9/2004 | Jung et al. | |
| 2005/0052582 A1 | 3/2005 | Mai | |
| 2005/0140892 A1 | 6/2005 | Kim et al. | |
| 2005/0231487 A1 | 10/2005 | Ming | |
| 2005/0243023 A1 | 11/2005 | Reddy et al. | |
| 2005/0243228 A1 | 11/2005 | Lee et al. | |
| 2005/0264232 A1 | 12/2005 | Choi et al. | |
| 2005/0270435 A1 | 12/2005 | Shiau et al. | |
| 2006/0007165 A1 | 1/2006 | Yang et al. | |
| 2006/0026521 A1 | 2/2006 | Hotelling et al. | |
| 2006/0145365 A1 | 7/2006 | Halls et al. | |
| 2006/0146033 A1 | 7/2006 | Chen et al. | |
| 2006/0146034 A1 | 7/2006 | Chen et al. | |
| 2006/0197753 A1 | 9/2006 | Hotelling | |
| 2006/0203151 A1 | 9/2006 | Kim | |
| 2006/0244736 A1 | 11/2006 | Tseng | |
| 2007/0018969 A1 | 1/2007 | Chen et al. | |
| 2007/0075977 A1 | 4/2007 | Chen et al. | |
| 2007/0097278 A1 | 5/2007 | Rho et al. | |
| 2007/0176905 A1 | 8/2007 | Shih et al. | |
| 2007/0216657 A1 | 9/2007 | Konicek | |
| 2007/0262967 A1 | 11/2007 | Rho | |
| 2008/0048994 A1 | 2/2008 | Lee et al. | |
| 2008/0055221 A1 | 3/2008 | Yabuta et al. | |
| 2008/0055268 A1 | 3/2008 | Yoo et al. | |
| 2008/0067528 A1 | 3/2008 | Choi et al. | |
| 2008/0074401 A1 | 3/2008 | Chung et al. | |
| 2008/0129898 A1 | 6/2008 | Moon | |
| 2008/0136980 A1 | 6/2008 | Rho et al. | |
| 2008/0150901 A1 | 6/2008 | Lowles et al. | |
| 2008/0158172 A1 | 7/2008 | Hotelling et al. | |
| 2008/0309627 A1 | 12/2008 | Hotelling et al. | |
| 2008/0309633 A1 | 12/2008 | Hotelling et al. | |
| 2009/0273577 A1 | 11/2009 | Chen et al. | |
| 2009/0323007 A1 | 12/2009 | Shim | |
| 2010/0001973 A1 | 1/2010 | Hotelling et al. | |
| 2010/0144391 A1 | 6/2010 | Chang et al. | |
| 2010/0149128 A1 | 6/2010 | No et al. | |
| 2010/0165278 A1 | 7/2010 | Matsumori et al. | |
| 2010/0277425 A1 | 11/2010 | Choi | |
| 2011/0012845 A1 | 1/2011 | Rothkopf et al. | |
| 2011/0074705 A1 | 3/2011 | Yousefpor et al. | |
| 2011/0222016 A1 | 9/2011 | Kaneko et al. | |
| 2011/0248949 A1 | 10/2011 | Chang et al. | |
| 2011/0298731 A1 | 12/2011 | Fu et al. | |
| 2012/0019473 A1 | 1/2012 | Edwards | |
| 2012/0092273 A1 | 4/2012 | Lyon et al. | |
| 2012/0154731 A1 | 6/2012 | Chang et al. | |
| 2012/0206395 A1 | 8/2012 | Misaki | |
| 2012/0206402 A1 | 8/2012 | Park et al. | |
| 2013/0045762 A1 | 2/2013 | Chang et al. | |
| 2013/0063891 A1 | 3/2013 | Martisauskas | |
| 2013/0093721 A1 | 4/2013 | Nakamura et al. | |
| 2013/0113734 A1 | 5/2013 | Cho et al. | |
| 2013/0113752 A1 | 5/2013 | Chang et al. | |
| 2014/0028618 A1 | 1/2014 | Chang et al. | |
| 2014/0139480 A1 | 5/2014 | Seo et al. | |
| 2014/0240286 A1 | 8/2014 | Chang et al. | |

FOREIGN PATENT DOCUMENTS

| | | |
|---|---|---|
| CN | 203422722 U | 2/2014 |
| CN | 203480484 U | 3/2014 |
| EP | 1 133 057 A2 | 9/2001 |
| EP | 1 133 057 A3 | 9/2001 |
| EP | 1 133 057 B1 | 9/2001 |
| EP | 1 422 601 | 5/2004 |
| EP | 1 455 264 A2 | 9/2004 |
| EP | 1 455 264 A3 | 9/2004 |
| EP | 1 939 673 A1 | 7/2008 |
| GB | 2 456 221 A | 7/2009 |
| GB | 2 475 054 A | 5/2011 |
| JP | 07-036017 A | 2/1995 |
| JP | 2000-163031 A | 6/2000 |
| JP | 2002-342033 A | 11/2002 |
| JP | 2010-152188 A | 7/2010 |
| KR | 10-2001-0083106 A | 8/2001 |
| KR | 10-2005-0070367 A | 7/2005 |
| KR | 10-2008-0091909 A | 10/2008 |
| WO | WO-85/03374 A1 | 8/1985 |
| WO | WO-2004/046905 A2 | 6/2004 |
| WO | WO-2004/046905 A3 | 6/2004 |
| WO | WO-2005/036510 A1 | 4/2005 |
| WO | WO-2007/146785 A2 | 12/2007 |
| WO | WO-2007/146785 A3 | 12/2007 |
| WO | WO-2010/065424 A2 | 6/2010 |
| WO | WO-2010/065424 A3 | 6/2010 |
| WO | WO-2013/184597 A1 | 12/2013 |
| WO | WO-2015/160377 A1 | 10/2015 |

OTHER PUBLICATIONS

Notice of Allowance mailed Feb. 7, 2014, for U.S. Appl. No. 12/315,869, filed Dec. 5, 2008, five pages.

Notice of Allowance mailed Apr. 30, 2013, for U.S. Appl. No. 13/656,580, filed Oct. 19, 2012, nine pages.

International Search Report mailed Sep. 17, 2013, for PCT Application No. PCT/US2013/043938, five pages.

International Search Report mailed Dec. 15, 2014, for PCT Application No. PCT/US14/57032, filed Sep. 23, 2014, three pages.

International Search Report mailed Jan. 22, 2015, for PCT Application No. PCT/US14/58701, filed Oct. 1, 2014, two pages.

(56) References Cited

OTHER PUBLICATIONS

Non-Final Office Action mailed Jul. 9, 2014, for U.S. Appl. No. 14/268,911, filed May 2, 2014, six pages.
Notice of Allowance mailed Aug. 13, 2014, for U.S. Appl. No. 14/268,911, filed May 2, 2014, five pages.
Non-Final Office Action mailed Aug. 10, 2015, for U.S. Appl. No. 14/286,718, filed May 23, 2014, eleven pages.
ROC (Taiwan) search report dated Mar. 26, 2015, for TW Patent Application No. 102119986, with English translation, two pages.
Final Office Action mailed Jul. 14, 2011, for U.S. Appl. No. 12/340,567, filed Dec. 19, 2008, eight pages.
Final Office Action mailed Aug. 22, 2012, for U.S. Appl. No. 12/315,869, filed Dec. 5, 2008, 13 pages.
International Search Report mailed Nov. 12, 2010, for PCT Application No. PCT/US2009/065978, four pages.
Kanda, E. et al. (2008). "55.2: Integrated Active Matrix Capacitive Sensors for Touch Panel LTPS-TFT LCDs," *SID 08 Digest,* pp. 834-837.
Lee, S. et al. (Oct. 2, 2002). "Ultra-FFS TFT-LCD with Super Image Quality, Fast Response Time, and Strong Pressure-Resistant Characteristics," *Journal of SID,* pp. 117-122.

Lee, S.K. et al. (Apr. 1985). "A Multi-Touch Three Dimensional Touch-Sensitive Tablet," *Proceedings of CHI: ACM Conference on Human Factors in Computing Systems,* pp. 21-25.
Non-Final Office Action mailed Feb. 14, 2011, for U.S. Appl. No. 12/340,567, filed Dec. 19, 2008, nine pages.
Non-Final Office Action mailed May 15, 2012, for U.S. Appl. No. 12/315,869, filed Dec. 5, 2008, 14 pages.
Notice of Allowance mailed Jan. 17, 2012, for U.S. Appl. No. 12/340,567, filed Dec. 19, 2008, 10 pages.
Notice of Allowance mailed Aug. 6, 2012, for U.S. Appl. No. 13/405,226, filed Feb. 24, 2012, seven pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Non-Final Office Action mailed Dec. 3, 2012, for U.S. Appl. No. 13/656,580, filed Oct. 19, 2012, seven pages.

\* cited by examiner

COLUMN SPACER DESIGN FOR A DISPLAY INCORPORATING A THIRD METAL LAYER

CROSS-REFERENCE TO RELATED APPLICATIONS

This application claims the benefit, under 35 U.S.C. §119(e), of U.S. Provisional Patent Application No. 61/656,476, filed Jun. 6, 2012, the contents of which are incorporated by reference herein in their entirety for all purposes.

FIELD OF THE DISCLOSURE

This relates generally to the formation of column spacers on display panels such as liquid crystal display (LCD) panels, and more particularly, to the formation of column spacers on display panels that can utilize a step height difference created by a third metal layer in order to minimize the possibility of damage to a display panel created by applying external forces to the panel.

BACKGROUND OF THE DISCLOSURE

Display screens of various types of technologies, such as liquid crystal displays (LCDs), organic light emitting diode (OLED) displays, etc., can be used as screens or displays for a wide variety of electronic devices, including such consumer electronics as televisions, computers, and handheld devices (e.g., cellular telephones, tablet computers, audio and video players, gaming systems, and so forth). LCD devices, for example, typically provide a flat display in a relatively thin package that is suitable for use in a variety of electronic goods. In addition, LCD devices typically use less power than comparable display technologies, making them suitable for use in battery-powered devices or in other contexts where it is desirable to minimize power usage.

LCD devices typically include multiple picture elements (pixels) arranged in a matrix. The pixels may be driven by scanning line and data line circuitry to display an image on the display that can be periodically refreshed over multiple image frames such that a continuous image may be perceived by a user. Individual pixels of an LCD device can permit a variable amount light from a backlight to pass through the pixel based on the strength of an electric field applied to the liquid crystal material of the pixel. The electric field can be generated by a difference in potential of two electrodes, a common electrode and a pixel electrode. In some LCDs, such as electrically-controlled birefringence (ECB) LCDs, the liquid crystal can be in between the two electrodes. In other LCDs, such as in-plane switching (IPS) and fringe-field switching (FFS) LCDs, the two electrodes can be positioned on the same side of the liquid crystal.

LCDs often require that the liquid crystal be "sandwiched" between two transparent glass substrates. The distance that is maintained between the glass substrates, can determine the thickness of the liquid crystal layer, and the thickness of the liquid crystal layer is correlated with the transmittance of light through the liquid crystal layer. A poor transmittance of light through the liquid crystal layer can have an adverse effect on the quality of an image being displayed. Therefore, maintaining a uniform distance between the glass substrates can be important to maintaining good image fidelity. Column spacers (otherwise known as post spacers) can be used to create a gap between glass substrates, thus maintaining the distance between glass substrates necessary to obtain a desired transmittance of the liquid crystal layer. External forces on the display, however, can cause the column spacers to deform and alter the gap between the glass substrates, thus altering the transmittance of the liquid crystal layer. Column spacers of varying heights can be used to reinforce an LCD panel, so that the gap between the glass substrates is maintained; however, column spacers with varying heights can be difficult to reliably fabricate.

SUMMARY OF THE DISCLOSURE

This relates to displays with column spacers that take advantage of a protrusion on a Thin Film Transistor (TFT) substrate in order to provide adequate protection to the display from deformation caused by external pressure and forces, while at the same time maintaining enough room in liquid crystal layer to allow the liquid crystal to adequately spread out during fabrication.

The protrusion on the substrate can be created for instance by a pixel TFT or a metal layer (M3) deposited onto the TFT substrate. One set of column spacers can be deposited on top of the protrusion, while another set of column spacers of substantially the same height of the first set can be deposited elsewhere. Due to the protrusion, the second set of column spacers will leave a gap between it and the TFT substrate, allowing for enough room for the liquid crystal layer to spread out. Having the two sets of column spacers be of a substantially similar height, can make the fabrication of column spacers easier.

DETAILED DESCRIPTION

Figure 1C:
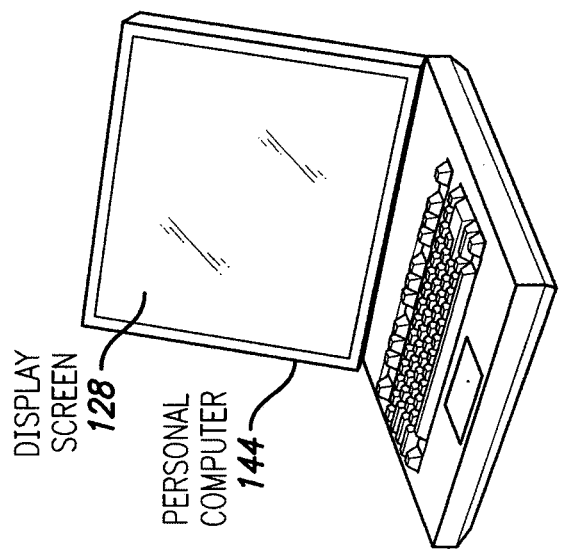
FIG. 1C illustrates an example personal computer that includes an LCD display screen according to some disclosed embodiments.

In the following description of embodiments, reference is made to the accompanying drawings which form a part hereof, and in which it is shown by way of illustration specific embodiments that can be practiced. It is to be understood that other embodiments can be used and structural changes can be made without departing from the scope of the disclosed embodiments.

This relates to the formation of display spacers such as liquid crystal display (LCD) column spacers of a substantially uniform height that adequately protect a gap thickness between glass substrates without impeding the ability of the liquid crystal (or similar material) to spread out. A first set of column spacers can be disposed on top of a raised step portion of a metal layer so that the column spacer touches the substrate. A second of set of column spacers, whose heights are approximately equal to the heights of the first set of column spacers, can be disposed such that a gap is created between the spacer and the substrate. This second set of spacers can be formed such that it provides adequate protection to the first set of column spacers against damage from external pressure, while at the same time maintaining a gap so that the liquid crystal can spread out through the panel. This can be achieved by having the first set of column spacers take advantage of a step height created by a metal layer.

Although embodiments disclosed herein may be described and illustrated herein in terms of Fringe Field Switching (FFS) Thin Film Transistor (TFT) LCDs, they can be used in other types of displays such as In Plane Switching (IPS), Electrically Controlled Birefringence (ECB) and Twisted Nematic (TN) LCDs. Furthermore, although embodiments herein may be described in terms of common electrodes made from Indium Tin Oxide (ITO), they can also apply to common electrodes fabricated from any conductive material. Additionally, although embodiments disclosed herein may be described and illustrated herein in terms of LCD displays in a common electrode on top configuration, they are also applicable to LCD display configurations in a common electrode on bottom configuration, or any type of display other than an LCD for which a uniform gap thickness is to be maintained.

Display screens of various types of technologies, such as liquid crystal displays (LCDs), organic light emitting diode (OLED) displays, etc., can be used as screens or displays for a wide variety of electronic devices, including such consumer electronics as televisions, computers, and handheld devices (e.g., cellular telephones, tablet computers, audio and video players, gaming systems, and so forth). LCD devices, for example, typically provide a flat display in a relatively thin package that is suitable for use in a variety of electronic goods. In addition, LCD devices typically use less power than comparable display technologies, making them suitable for use in battery-powered devices or in other contexts where it is desirable to minimize power usage.

Figure 1B:
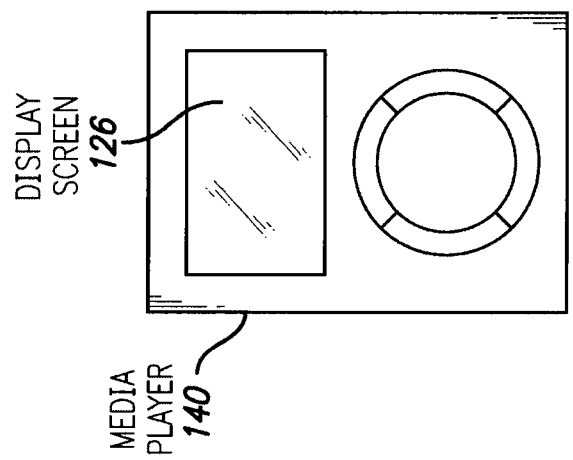
FIG. 1B illustrates an example digital media player that includes an LCD display screen according to some disclosed embodiments.
Figure 1A:
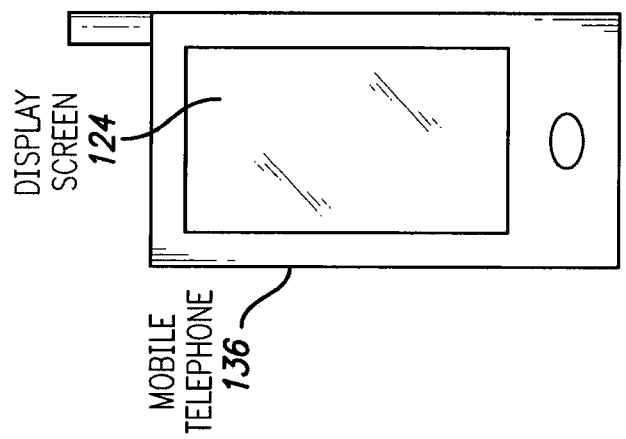
FIG. 1A illustrates an example mobile telephone that includes an LCD display screen according to some disclosed embodiments.

FIGS. 1A-1C show example systems in which LCD screens (which can be part of touch screens) according to embodiments of the disclosure may be implemented. FIG. 1A illustrates an example mobile telephone 136 that includes an LCD display screen 124. FIG. 1B illustrates an example digital media player 140 that includes an LCD display screen 126. FIG. 1C illustrates an example personal computer 144 that includes an LCD display screen 128. LCD display screens 124, 126 and 128 can include numerous layers that are stacked on top of each other and bonded together to form the display.

Figure 2:
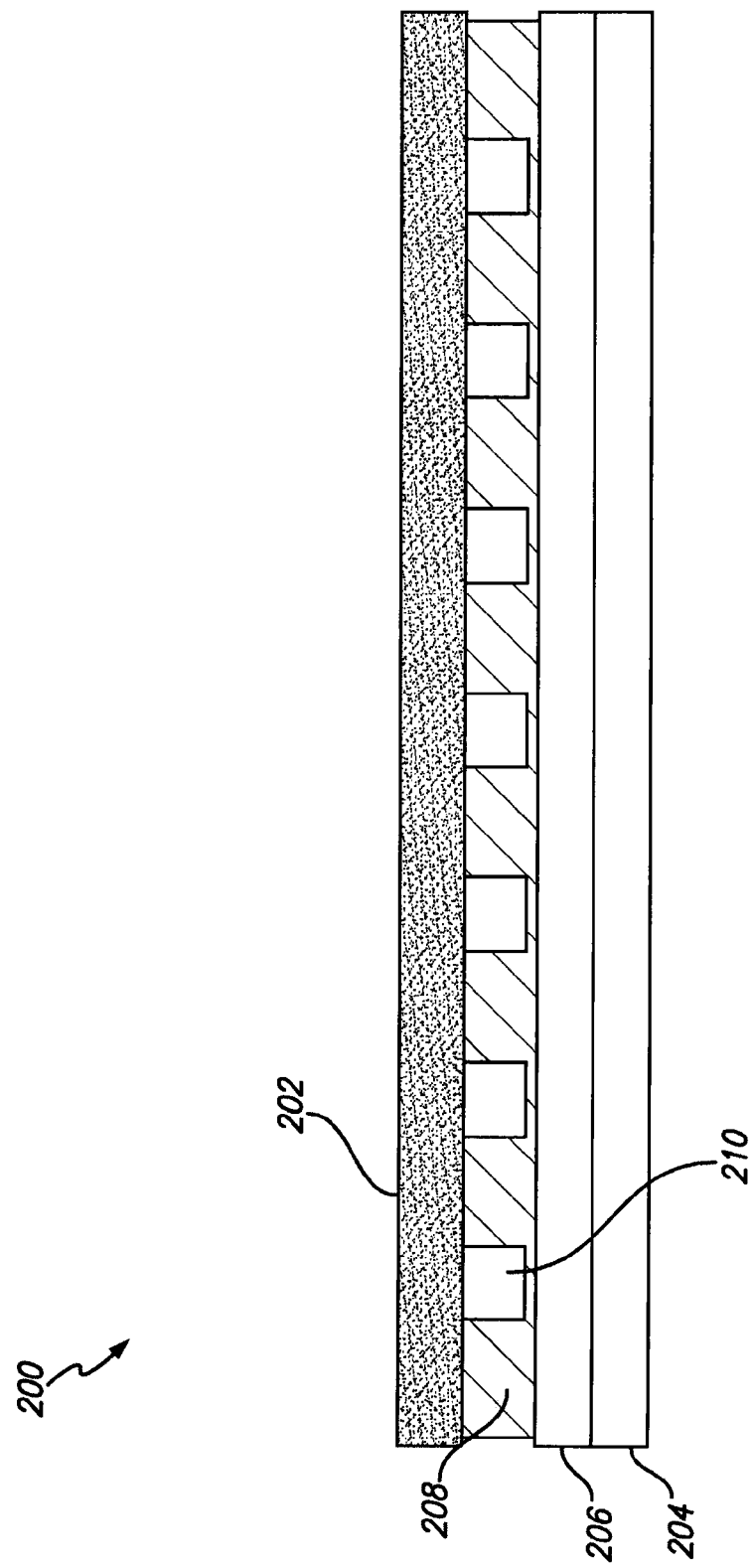
FIG. 2 illustrates an exemplary layer stack up of an LCD panel according to some disclosed embodiments.

FIG. 2 illustrates an exemplary layer stack up of an LCD panel. LCD Panel 200 can include multiple layers bonded together to form one LCD panel. For instance, LCD panel 200 can consist of a color filter glass 202 and a TFT glass 204 which can be located on opposing ends of the stack up. TFT glass 204 can have a TFT substrate layer 206 disposed immediately on top of it. TFT substrate layer 206 can contain the electrical components necessary to create the electric field that drives the liquid crystal layer 208. More specifically, TFT substrate 206 can include various different layers that include display elements such as data lines, gate lines, TFTs, common and pixel electrodes, etc. These components can help create a controlled electric field that orients liquid crystals located in liquid crystal layer 208 into a particular orientation, based on the desired color to be displayed at any particular pixel. A set of column spacers 210 can be disposed on color filter glass 202. The column spacers 210 can maintain a gap between color filter glass 202 and TFT substrate 206, so that liquid crystal layer 208 can occupy the gap and maintain a desired thickness. Column spacers can be made from a photoresist material and can be fabricated using a photolithography or photoengraving process in which the photoresist material deposited on color filter glass 202 is exposed to ultraviolet light to form a pattern. One skilled in the art will recognize that the thickness of liquid crystal layer 208 can influence the transmittance of light through the liquid crystal layer from a back light (not pictured), which in turn can affect the quality of an image display on the LCD. Therefore, maintaining a uniform liquid crystal layer thickness can be important in maintaining the image quality of a display. Column spacers 210 can work to ensure that the liquid crystal layer 208 is maintained at a uniform thickness.

Figure 3:
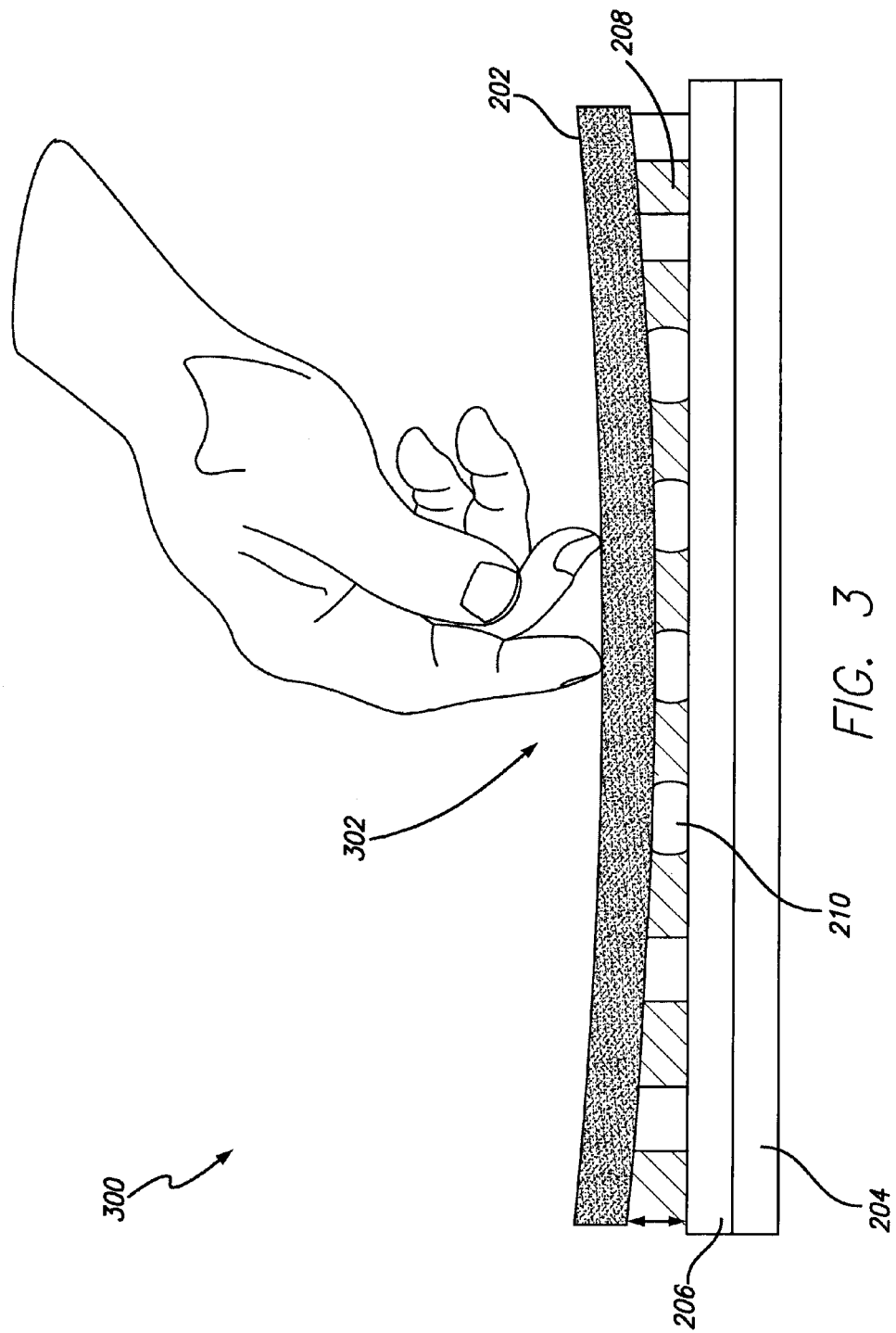
FIG. 3 illustrates an exemplary cross-section of a layer stack up of an LCD panel while an external force is being exerted on the panel according to some disclosed embodiments.

FIG. 3 illustrates an exemplary cross-section of a layer stack-up of an LCD panel while an external force is being exerted on the panel. When external force 302 is applied to the panel 300, it can cause color filter glass 202 to compress due to the flexibility and elasticity inherent in the material used to fabricate the color filter glass 202. Column spacers 210 can help to give support to color filter glass 202, and can reduce the amount of compression to color filter glass 202 caused by external force 302. As illustrated in FIG. 3, column spacers 210 can be disposed between color filter glass 202 and TFT substrate 206, so that one side of the column spacer touches the color filter glass and the other side of the column spacer touches the TFT substrate. When external force 302 is applied, column spacers 210 can absorb some of the force. However in doing so, column spacers 210 can compress due to the flexibility and elasticity of the material used to fabricate the column spacer. Column spacer density expressed as a percentage of total surface area of the LCD display panel can represent the amount of column spacers used to maintain the gap between color filter glass 202 and TFT substrate 206. For instance, a column spacer density of 3% means that 3% of the surface area of the LCD panel is covered by a column spacer. An LCD panel with a column spacer density of 3% has more column spacers than an LCD panel with a column spacer density of 1%. A higher column spacer density can be achieved by placing the column spacers closer to each other, so that more can be deposited on the color filter glass. If column spacers 210 are placed in close proximity to each other as shown in FIG. 3, the compression experienced by an individual column spacer can be reduced.

Figure 4:
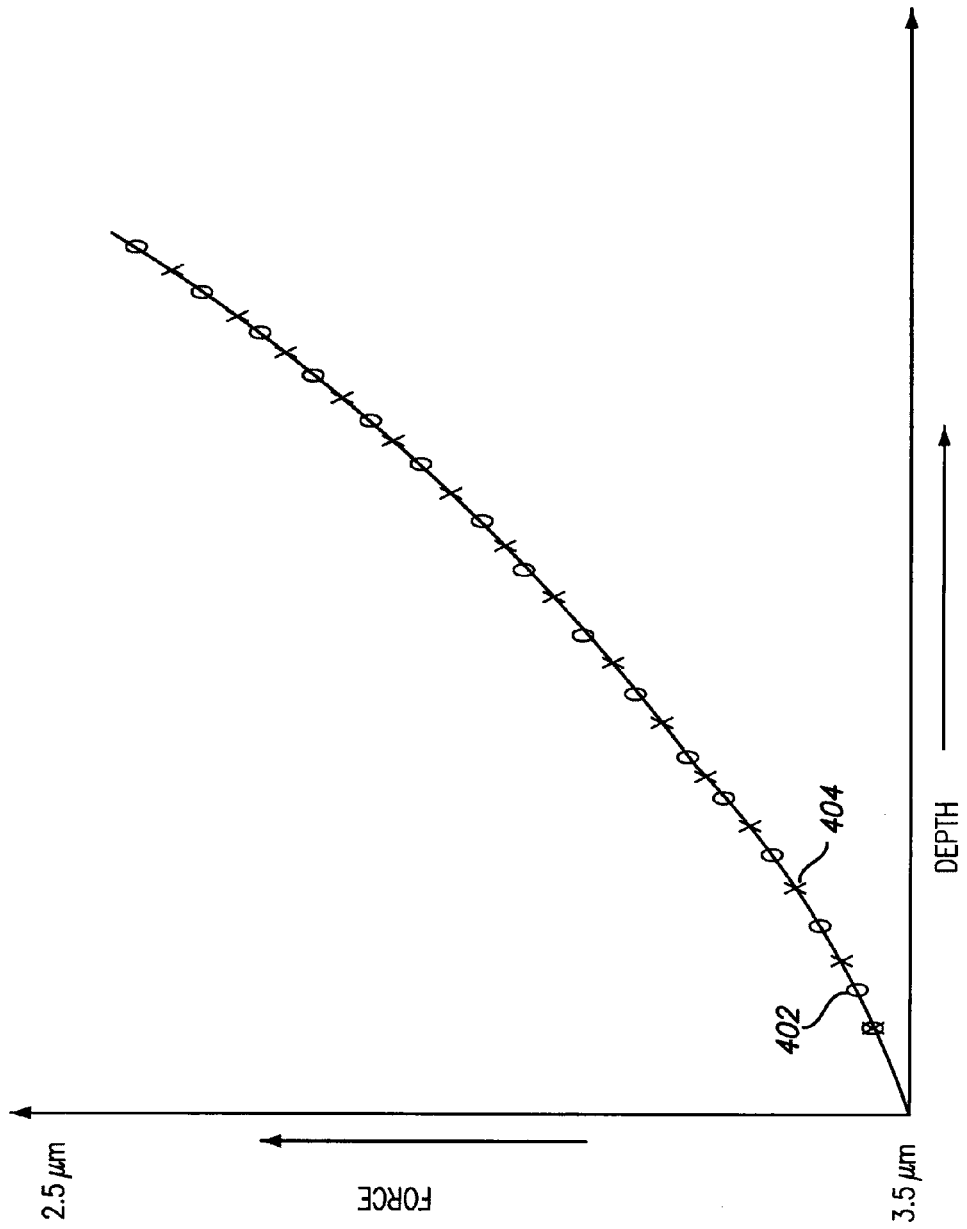
FIG. 4 illustrates an exemplary force-depth curve of an individual column spacer according to some disclosed embodiments.

FIG. 4 illustrates an exemplary force-depth curve (otherwise known as a modulus curve) of an individual column spacer 210 in a configuration illustrated in FIG. 3. The y-axis of the graph is a representation of the amount external force 302 being applied to the panel 300, with increasing force indicated by the arrow. The x-axis represents the height/depth of column spacer 210 when an external force 302 is being applied to it, with decreasing height/depth indicated by the arrow. As one of ordinary skill in the art will recognize, a force-depth curve actually represents two curves. The first curve, represented by circles 402, shows the height/depth of column spacer 210 as the external force 302 is increased. As shown, as the external force 302 increases, the height of column spacer 210 is decreased due to the compression experienced by the column spacer as discussed above. The second curve, represented by Xs 404, which is read from right to left, represents the height/depth of column spacer 210 as the external force 302 is being removed from the column spacer. Since the panel 300 of FIG. 3 has column spacers 210 which are placed in close proximity to each other, the second curve completely overlaps the first curve, meaning that as the force is removed, the height/depth of the column spacer returns to its original height when no force is being applied. This can mean that the close proximity of column spacers 210 allows for individual column spacers to experience minimal deformation due to an external force being applied to the panel 300. When the external force 302 is removed from the panel 300, the column spacers can return to their original height, and the gap between color filter glass 202 and TFT substrate 206 is maintained such that the thickness of liquid crystal layer 208 is maintained, which in turn means that the transmittance of light through the liquid crystal layer is maintained.

While placing column spacers 210 in close proximity to one another can minimize the deformation/compression experienced by column spacers, it can cause problems in fabrication of a liquid crystal display, in so far as the liquid crystal may not have adequate room to spread out through the panel. If the liquid crystal layer does not adequately spread out during fabrication of the panels, the LCD display may become inoperable. Thus, while one would place column spacers 210 in close proximity to each other in order to ensure that no individual column spacer becomes deformed when an external force is applied to it, the proximity of column spacers to one another is constrained by the need for a liquid crystal material to adequately spread out during the panel fabrication process.

Figure 5:
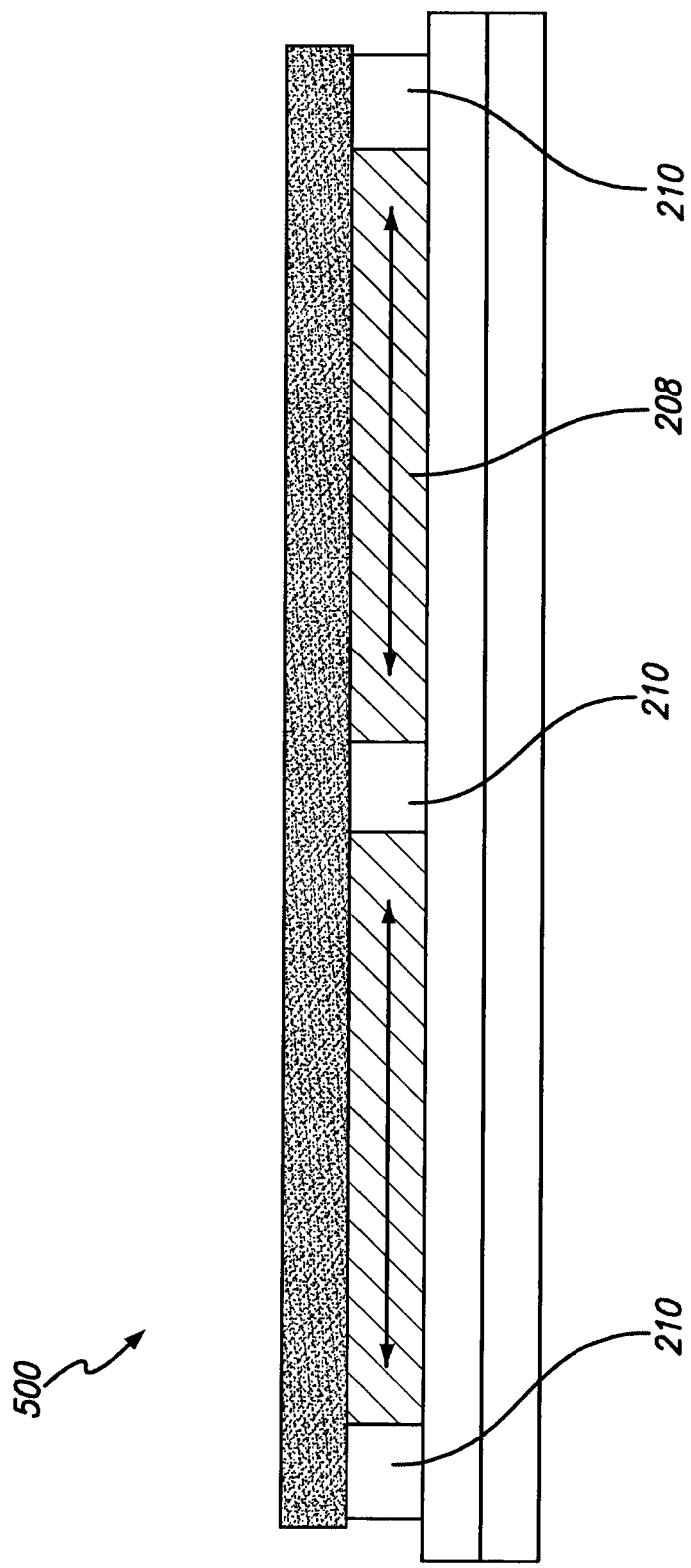
FIG. 5 illustrates an exemplary panel stack up with a reduced column spacer density according to some disclosed embodiments.

FIG. 5 illustrates an exemplary panel stack up with a reduced column spacer density according to one disclosed embodiment. Column spacers 210 are now placed at a greater distance apart from each other, so as to reduce the total column spacer density of the panel. A reduced column spacer density can provide more space for liquid crystal layer 208 to spread out during the fabrication of the panel.

Figure 6:
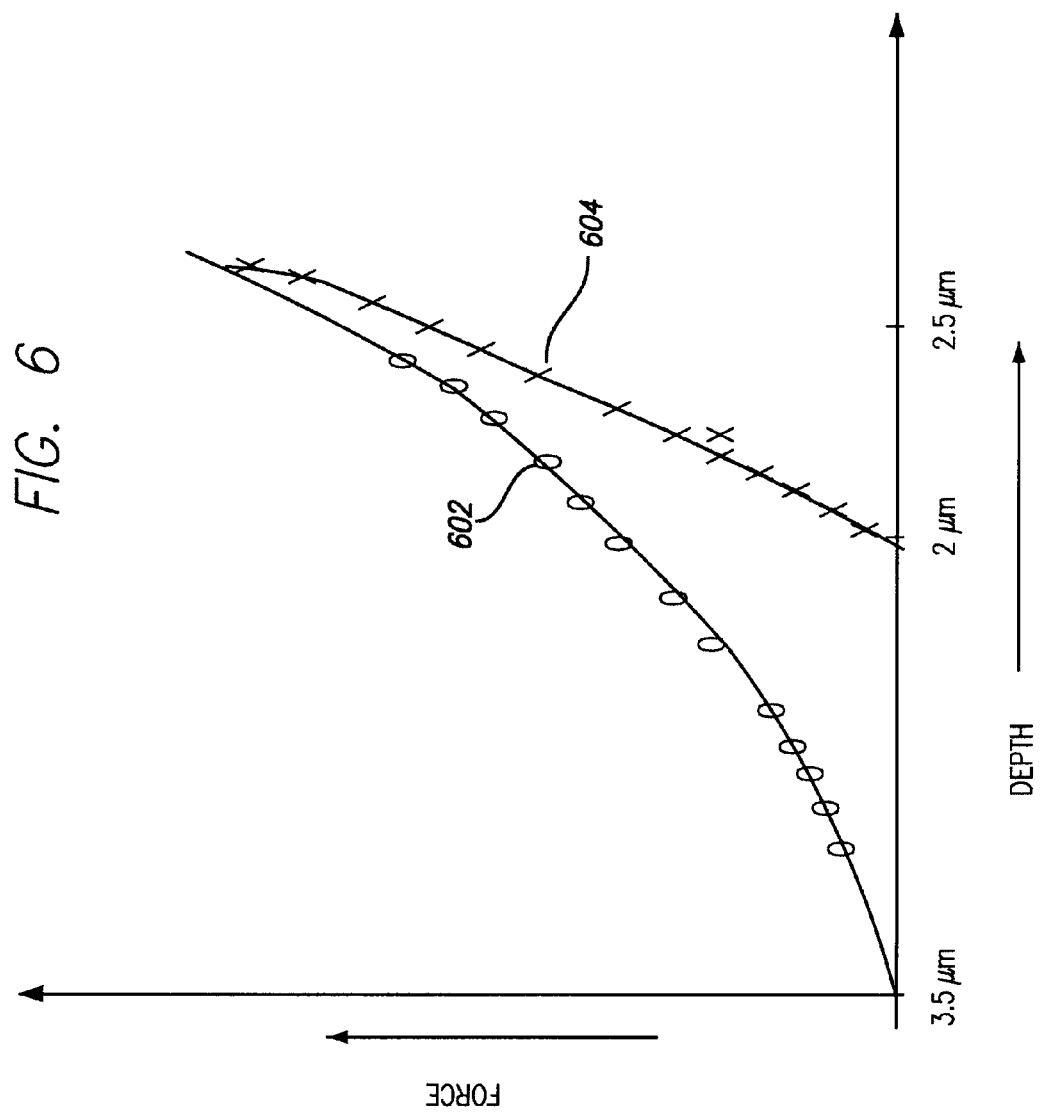
FIG. 6 illustrates an exemplary force-depth curve for an LCD panel column spacer arrangement according to some disclosed embodiments.

FIG. 6 illustrates an exemplary force-depth curve for the LCD panel column spacer arrangement of FIG. 5. As an external force 302 is increased, the column spacer 210 becomes compressed, reducing its height/depth as represented by the first curve 602. However, since the column spacer density is now lower, each individual column spacer 210 can be required to bear more of the force, meaning that a particular applied force 302 may cause the height/depth of the column spacer to decrease to a greater extent than an LCD panel whose column spacer density is higher. This increased compression on an individual column spacer 210 can permanently deform the column spacer, meaning that even when the force is removed from the panel, the column spacer may no longer return to its original height/depth and instead may become permanently compressed. This phenomenon is expressed by curve 604 which shows that as the force 302 is removed from the panel, the column spacer does not return to its original height of 3.5 µm, but instead returns to a compressed height of 2.0 µm.

If a column spacer 210 becomes permanently compressed/deformed by an excess amount of force, the column spacer may no longer be able to maintain a uniform gap between the color filter glass 202 and the TFT substrate 206. A non-uniformity in the gap between color filter glass 202 and TFT substrate 206 means that the thickness of liquid crystal layer 208 may no longer be uniform, which in turn can mean that the transmittance of light through liquid crystal layer 208 at the site of the deformation/compression of the column spacer can be altered. An altered transmittance of light at a particular spot on the LCD panel can render a permanent and visible visual defect at the site of the compression.

Figure 7A:
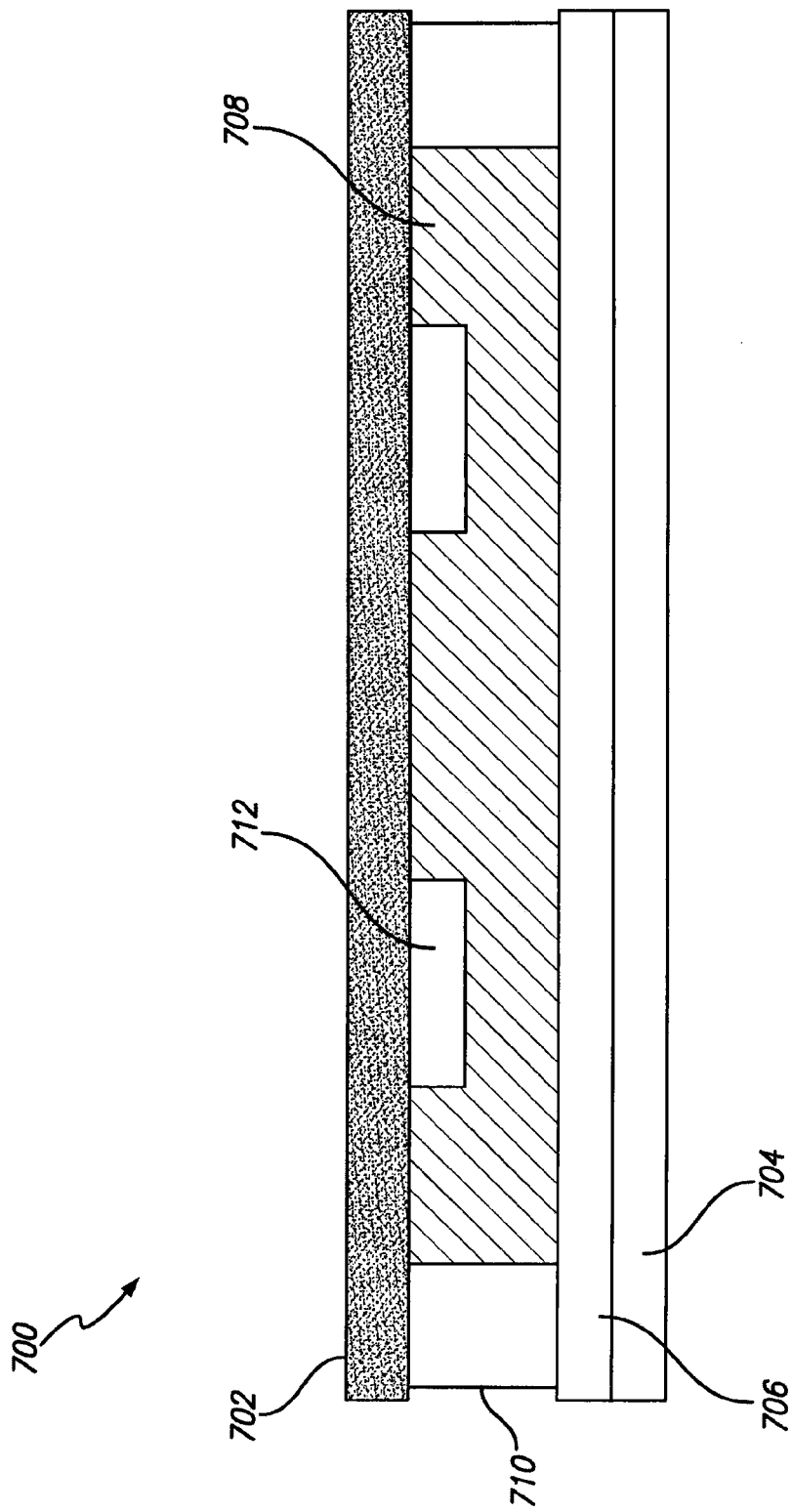
FIG. 7a illustrates yet another exemplary panel stack up column spacer arrangement according to some disclosed embodiments.

FIG. 7a illustrates an exemplary panel stack up column spacer arrangement according to one disclosed embodiment. Panel stack up 700 is arranged similarly to panel stack up 200 of FIG. 2. Panel 700 can contain a color filter glass 702 and a TFT glass 704 which can be located on opposing ends of the stack up. TFT glass 704 can have a TFT substrate layer 706 disposed immediately on top of it. TFT substrate layer 706 can contain the electrical components necessary to create the electric field that drives the liquid crystal layer 708. More specifically, TFT substrate 706 can include various different layers that include display elements such as data lines, gate lines, TFTs, common and pixel electrodes, etc. These components can help to create a controlled electric field that orients liquid crystals located in liquid crystal layer 708 into a particular orientation based on the desired color to be displayed at any particular pixel. Panel 700 differs from the panel illustrated in FIG. 2, in so far as it contains two sets of columns spacers 710 and 712. Column spacers 710 and 712 can differ in height. Column spacers 710 can be of a height so that one end of the column spacer touches the color filter glass 702 and the other end of the column spacer touches the TFT substrate 706. Column spacers 712 can be of height such that one end of the column spacer touch the color filter glass 702 and the other end leaves a gap between the end of the column spacer and the TFT substrate, which leaves room for the liquid crystal to flow underneath them and spread out. As an example, the gap could be approximately 0.5 µm, meaning that the heights of column spacers 710 and 712 differ by that amount. Furthermore, in some embodiments, the column spacer density of column spacer 710 can be different from the column spacer density of column spacer 712.

Figure 7B:
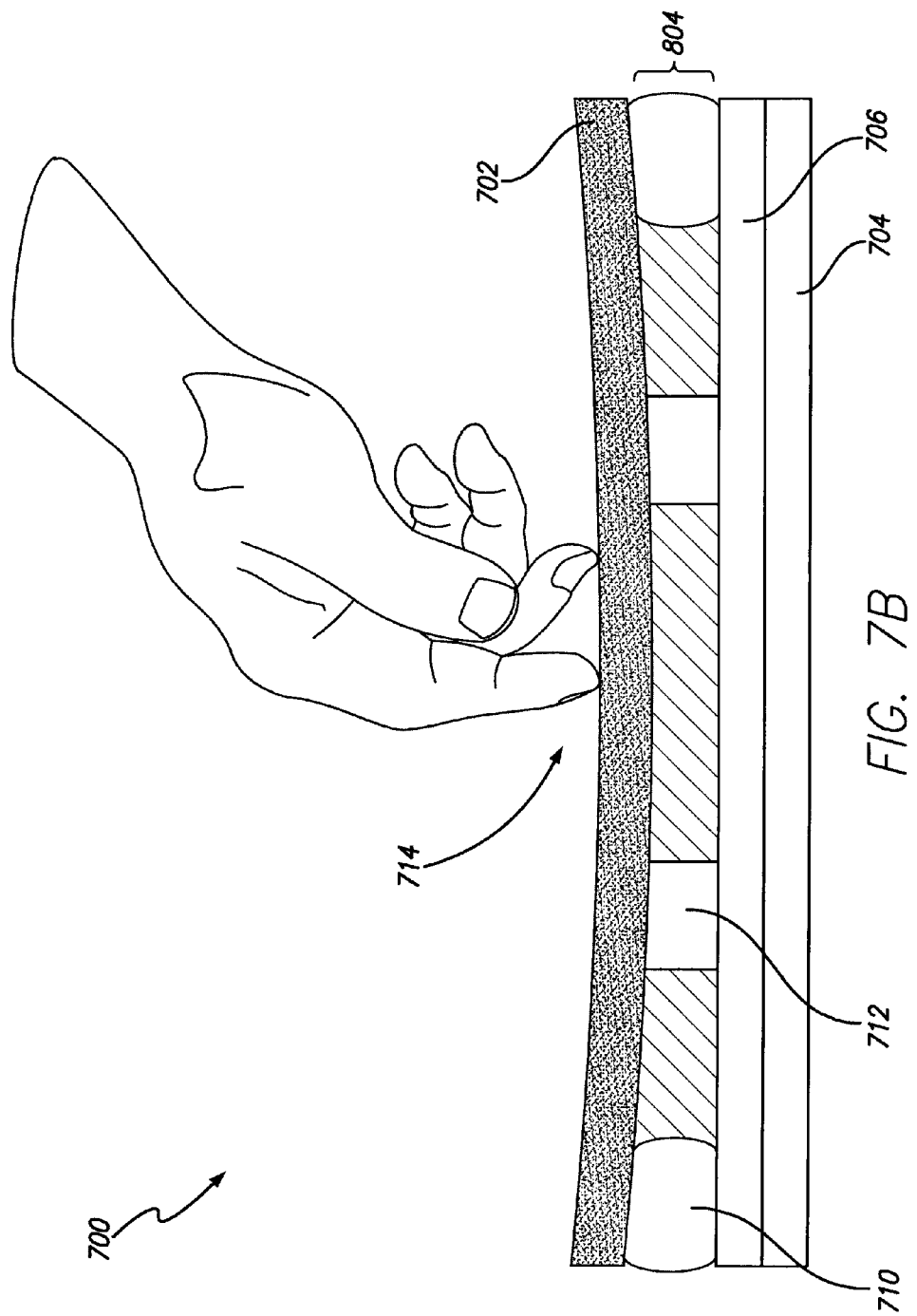
FIG. 7b illustrates yet another exemplary cross-section of a layer stack up of the LCD panel while an external force is being exerted on the panel according to some disclosed embodiments.

FIG. 7b illustrates the cross-section of the layer stack up of the LCD panel while an external force is being exerted on the panel according to one disclosed embodiment. When an external force 714 pushes down on panel 700, column spacers 710, whose heights are sufficient to span the gap between the color filter glass 702 and TFT substrate 706, can begin to compress due to the force. The compression can cause the gap 804 between color filter glass 702 and TFT substrate 706 to be reduced. Eventually, as force 714 causes the panel 700 to compress, the gap 804 becomes small enough so that column spacers 712 no longer have a gap between their ends and TFT substrate 706. When column spacer 712 begins to touch TFT substrate 706, it can then begin to absorb some of the force 714 being applied, and minimize or reduce the amount of compression being experienced by column spacer 710. From a force-depth curve point of view, this can mean that column spacer 710 can have a force-depth curve similar to that of FIG. 4 in that when the force is removed, the column spacer can return to its original height. Column spacer 712 can make this possible by providing additional support to column spacer 710 prior to column spacer 710 compressing to the point where it becomes permanently deformed. This can allow the column spacer density of column spacers 710 to remain lower, allowing for adequate room for the liquid crystal layer 708 to spread out. The column spacer density of column spacers 712 can remain high as compared to column spacers 710, since it does not impede the liquid crystal layer. Since column spacers 712 are short enough to provide a gap between the column spacer and the TFT substrate 706, they do not impede the liquid crystal layer; however, when the panel becomes compressed it can provide the necessary support to prevent the main column spacers 710 from becoming permanently deformed.

While an LCD panel that incorporates column spacers of different heights can provide various benefits as discussed above, it can provide some disadvantages. One such disadvantage is that the fabrication of the column spacers can become more difficult when the column spacers vary in height. Column spacers can be fabricated by depositing a photoresist layer on a color filter glass and then exposing the photoresist layer to a ultraviolet (UV) light. Portions of the photoresist layer can be masked (covered so that it is not exposed or partially exposed to light) to form a desired pattern. The masking required to generate a pattern of column spacers that vary in height can be more difficult to generate than a pattern in which the column spacers have a uniform height. This difficulty can make the fabrication process of the LCD panel more complex and time consuming.

One method of creating a column spacer arrangement as described above and illustrated in FIG. 7 is to take advantage of various physical properties of the TFT substrate layer.

Figure 8:
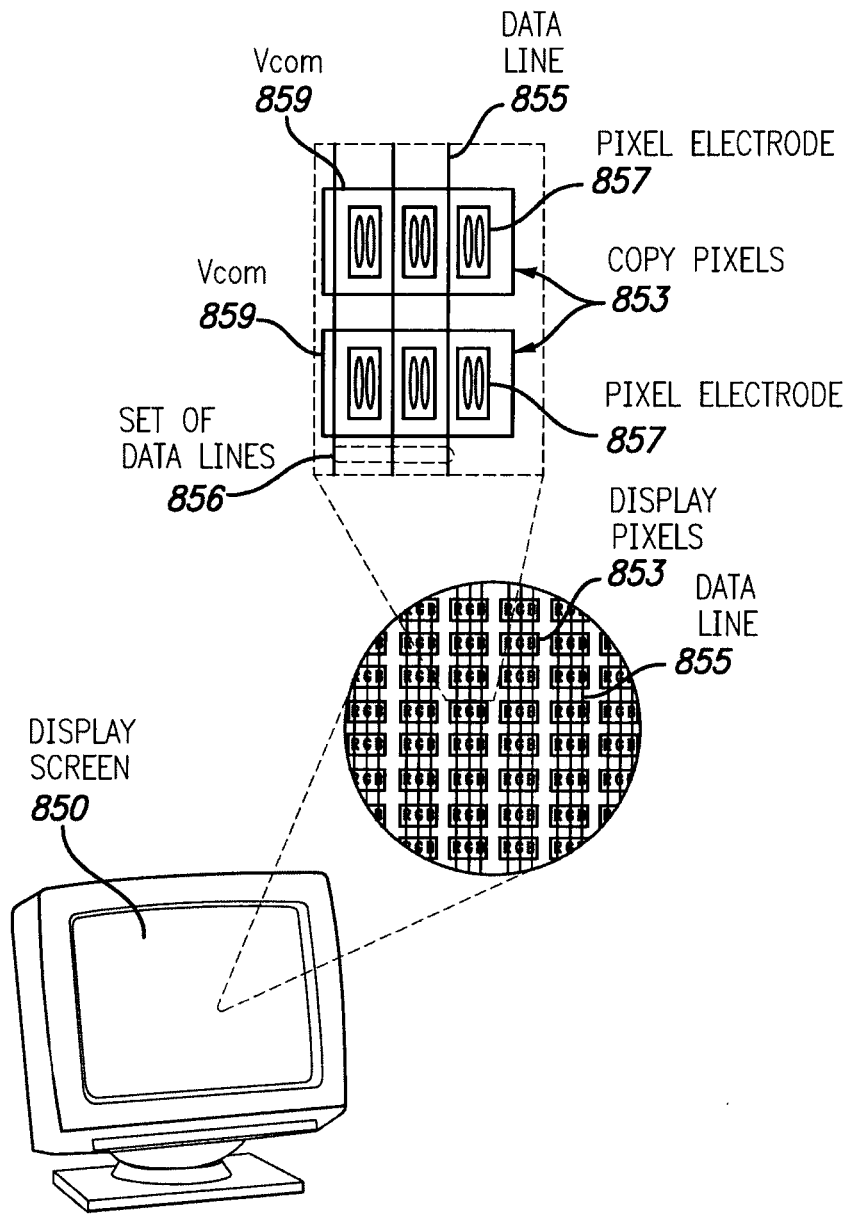
FIG. 8 illustrates an example LCD display screen with a magnified view of the two display pixels according to some disclosed embodiments.

FIG. 8 illustrates an example LCD display screen with a magnified view of two display pixels. Each display pixel can include pixel electrodes 857. Each display pixel can include a common electrode (Vcom) 859 that can be used in conjunction with pixel electrodes 857 to create an electrical potential across a pixel material (not shown). Varying the electrical potential across the pixel material can correspondingly vary an amount of light emanating from the pixel. In some embodiments, for example, the pixel material can be liquid crystal. A common electrode voltage can be applied to a Vcom 859 of a display pixel, and a data voltage can be applied to a pixel electrode 857 of a sub-pixel of the display pixel through the corresponding data line 855. A voltage difference between the common electrode voltage applied to Vcom 859 and the data voltage applied to pixel electrode 857 can create the electrical potential through the liquid crystal of the pixel. The electrical potential can generate an electric field through the liquid crystal, which can cause inclination of the liquid crystal molecules to allow polarized light from a backlight (not shown) to emanate from the sub-pixel with a luminance that depends on the strength of the electric field (which can depend on the voltage difference between the applied common electrode voltage and data voltage). In other embodiments, the pixel material can include, for example, a light-emitting material, such as can be used in organic light emitting diode (OLED) displays.

Figure 9:
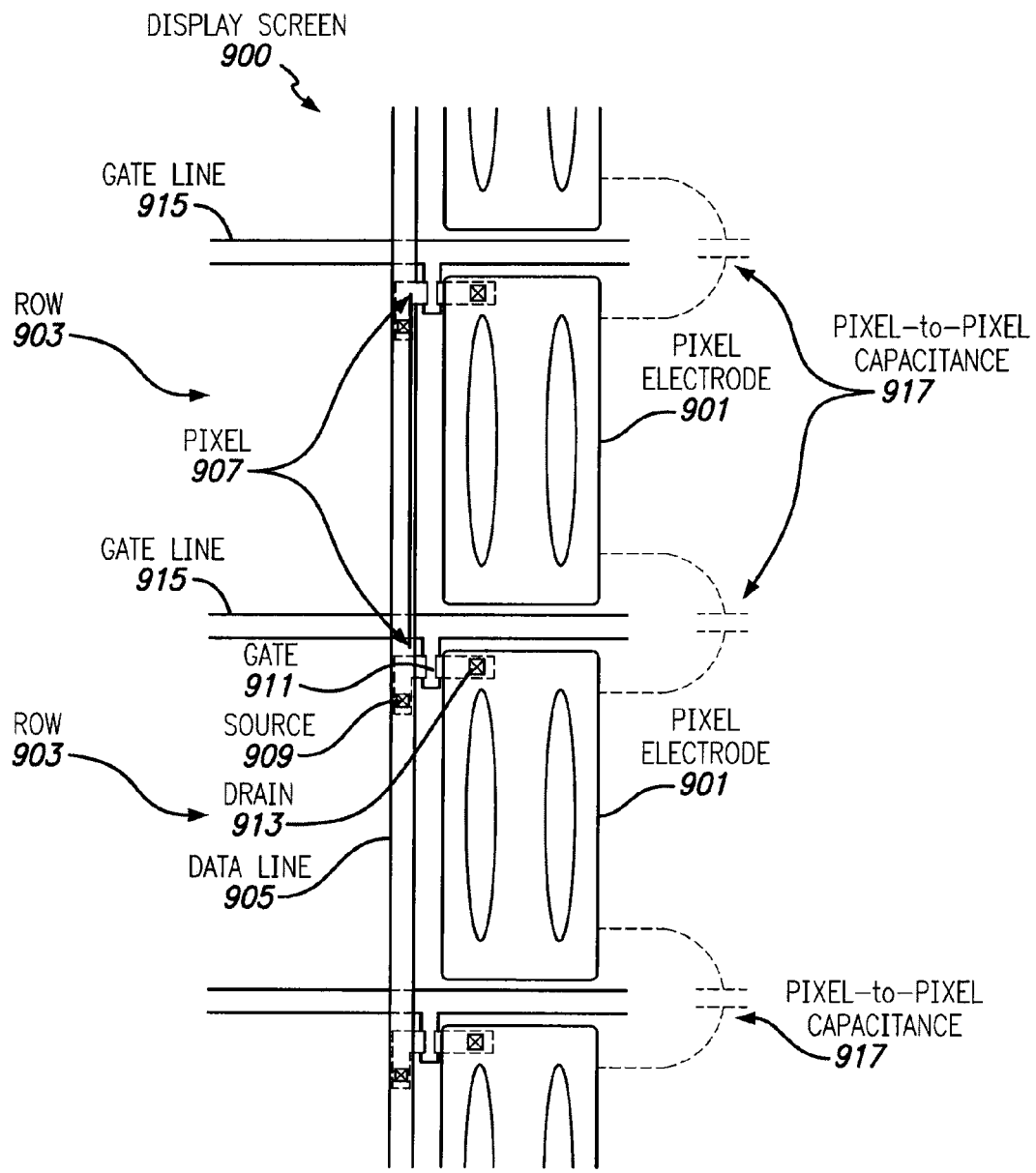
FIG. 9 illustrates an example arrangement of pixel electrodes deposited on a TFT substrate according to some disclosed embodiments.

FIG. 9 illustrates an example arrangement of pixel electrodes 901 deposited on a TFT substrate in an example display screen 900. Pixel electrodes 901 can have an arrangement similar to pixel electrodes 857 in FIG. 8, for example, in which the pixel electrodes can be arranged in horizontal lines, such as rows 903. For the purpose of clarity, other pixel electrodes in rows 903 of display screen 900 are not shown in this figure. Pixel electrodes 901 shown in FIG. 9 can each be associated with a data line 905, such as data line 855 in FIG. 8. Each pixel TFT 907 can include a source 909 connected to data line 905, a gate 911, and a drain 913 connected to pixel electrode 901. Each pixel TFT 907 in one row 903 of pixels can be switched on by applying an appropriate gate line voltage to a gate line 915 corresponding to the row. During a scanning operation of display screen 900, a target voltage of each pixel electrode 901 in one row 903 can be applied individually to the pixel electrode by switching on pixel TFTs 907 of the of the row with the corresponding gate line 915 while the target voltages of each pixel electrode in the row are being applied to data lines 905.

Figure 10:
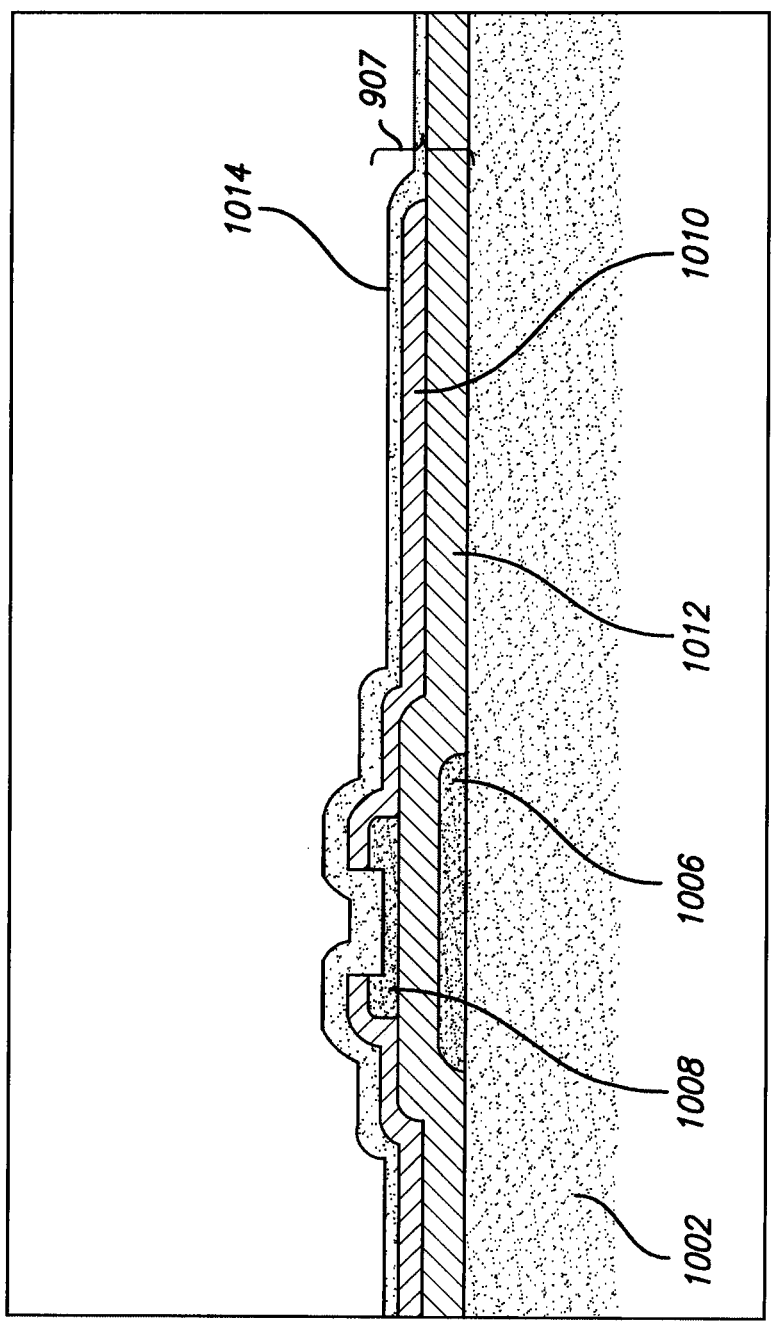
FIG. 10 illustrates an exemplary cross-sectional view of a partial LCD display layer stackup according to some disclosed embodiments.

FIG. 10 illustrates a cross-sectional view of a partial LCD display layer stackup according to some disclosed embodiments. As previously illustrated, a TFT glass 1002 can have a TFT substrate deposited on top of it. The TFT substrate layer can contain the pixel electronics described in FIG. 9. In this particular view, only the pixel TFT 907 is shown. The pixel TFT 907 can be composed of gate line 1006, data line 1010, gate insulator 1012 and dielectric layer 1014. As illustrated, the pixel TFT 907 can create a protrusion or step on the TFT substrate layer.

Figure 11:
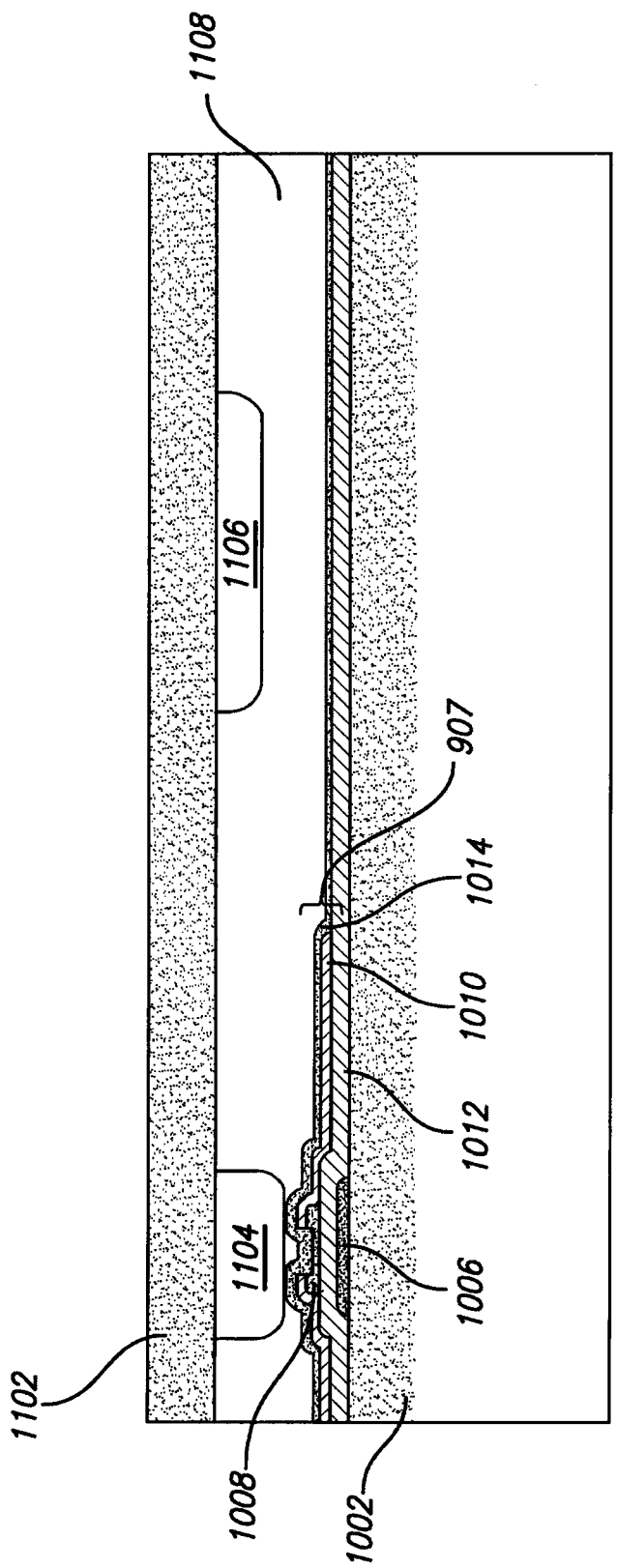
FIG. 11 illustrates yet another cross-sectional view of a partial LCD display layer stackup according to some disclosed embodiments.

FIG. 11 illustrates the cross-sectional view of FIG. 10 with the color filter glass 1102, liquid crystal layer 1108 and column spacers 1104 and 1106 disposed on top. As illustrated, the first set of column spacers 1104 are now disposed on top of the protrusion on the TFT substrate created by pixel TFT 907. The fact that the first set of column spacers 1104 sits on top of a step created by the pixel TFT 907 can mean that the second set of column spacers 1106 can be of the same or substantially the same height as the first set of column spacers 1104, while still maintaining a gap between the bottom of the column spacer 1106 and the TFT substrate. By taking advantage of a step/protrusion created pixel TFT 907, a second set of column spacers 1106 can be created to provide adequate support to the first set of columns spacers 1104, while maintaining a gap, so that the liquid crystal layer 1108 can have adequate room to spread out. Since the step created by pixel TFT 907 allows for the second set of column spacers 1106 to be of equal or substantially equal height as the first set of column spacers 1104, the column spacers can be more easily fabricated than if the heights were different as discussed above.

Figure 12:
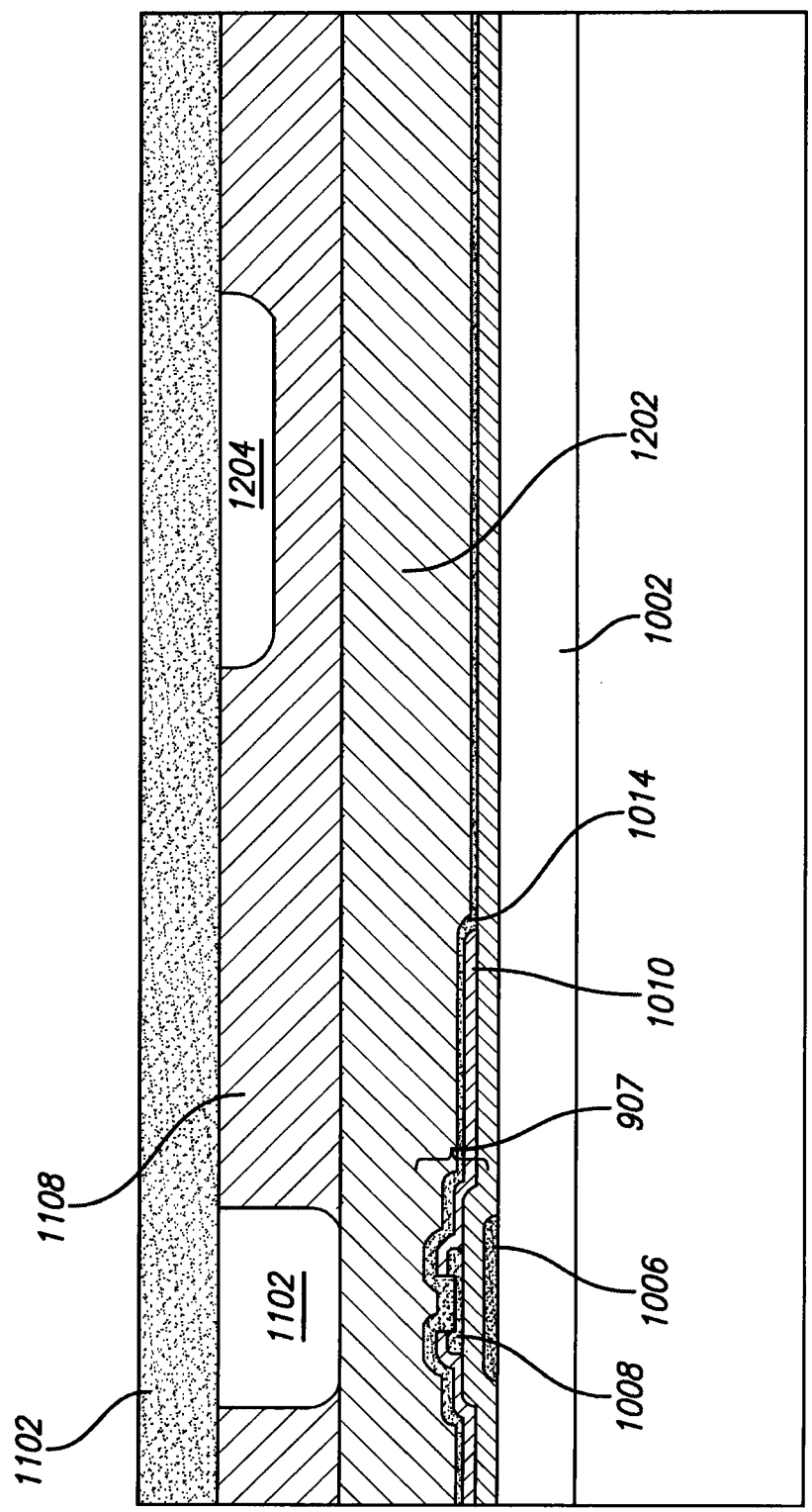
FIG. 12 illustrates an exemplary LCD panel layer stack up with a passivation layer according to some disclosed embodiments.

As one skilled in the art will recognize, any RC time constant delay on the conductive components of a pixel TFT 907 can constrain the refresh rate of an LCD display by slowing down the speed in which voltage on data lines can change. One way to reduce an RC delay of the pixel electrode 901 or pixel TFT 907 is to place a passivation layer on top the pixel TFT. A passivation layer can help to electrically isolate the pixel TFT so that any stray capacitances caused by external conductors to the TFT don't increase the total capacitance of the TFT, thus keeping the RC time delay of the TFT smaller. FIG. 12 illustrates an LCD stackup with a passivation layer. As illustrated, passivation layer 1202 is disposed on top of the TFT substrate in order to reduce RC delay. In doing so however, the passivation layer 1202 can cause a planarization of the TFT substrate, which can remove the step/protrusion created by the pixel TFT 907. With the step created by the pixel TFT 907 removed by the planarization, the second set of column spacers 1106 can no longer be the same height or substantially the same height as the first set of column spacers 1104 and still maintain a gap to allow the liquid crystal layer 1108 to spread out. In order to maintain a gap, a second set of column spacers 1204 can be fabricated. The height of column spacers 1204 can be shorter than column spacers 1104 in order to maintain the gap necessary for the liquid crystal layer 1108 to spread out. However, as discussed above, an LCD panel with column spacers of varying heights can be difficult to fabricate.

Common electrodes 859 of FIG. 8 can be made from Indium Tin Oxide (ITO), which is a clear conductive material that can be used in display screens so as to not obscure an aperture of a display. One skilled in the art will recognize that a large RC delay is inherent in ITO. The RC delay inherent in ITO can be large enough that simply applying a passivation layer may not be sufficient to adequately decrease the delay to a required level. One method to reduce an RC delay of an ITO common electrode is disclosed in "Common Bus Design for a TFT-LCD Display" (Chang et. al, U.S. Patent Publication No. 2010/0123866), incorporated herein by reference in its entirety for all purposes. Chang discloses utilizing a metal layer to create a common bus for the common electrodes 859 so as to reduce their resistivity, thus decreasing the RC time delay caused by the ITO material of the common electrode.

Figure 13:
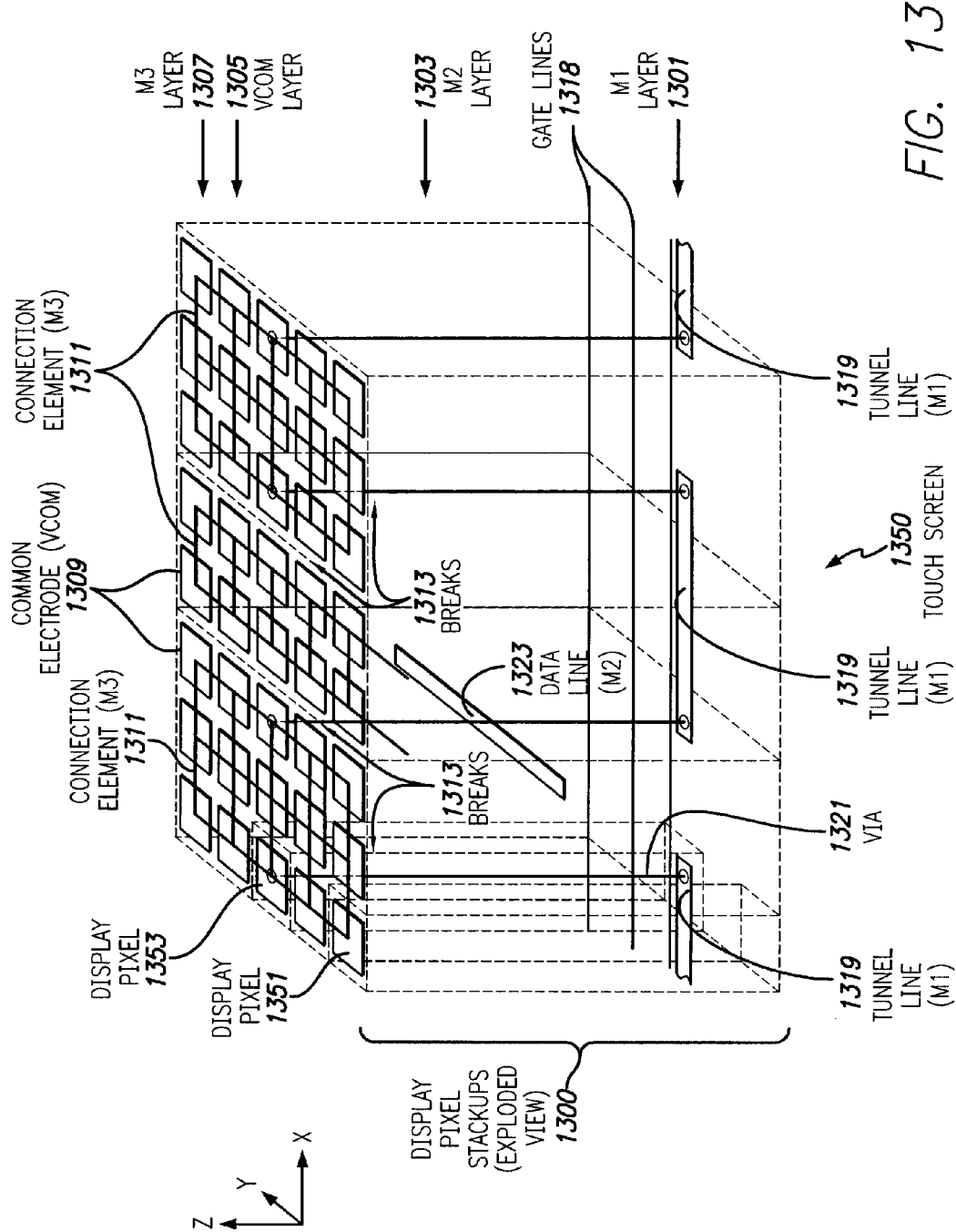
FIG. 13 illustrates an exploded view of display pixel stack-ups according to some embodiments.

FIG. 13 is a three-dimensional illustration of an exploded view (expanded in the z-direction) of example display pixel stackups 1300 showing some of the elements within the TFT substrate of an example display.

Stackups 1300 can include elements in a first metal (M1) layer 1301, a second metal (M2) layer 1303, a common electrode (Vcom) layer 1305, and a third metal (M3) layer 1307. Each display pixel can include a common electrode 1309 that is formed in Vcom layer 1305. M3 layer 1307 can include connection element 1311 that can electrically connect together common electrodes 1309 in order to form a common bus as disclosed in Chang. M1 layer 1301 can include tunnel lines (also referred to as "bypass lines") 1319 that can electrically connect together different groups of common electrodes through connections, such as conductive vias 1321, which can electrically connect tunnel line 1319 to the grouped common electrodes in drive region segment display pixels. M2 layer 1303 can include data lines 1323, which drive each individual pixel. Only one data line 1323 is shown for the sake of clarity; however, a display can include multiple data lines running through each vertical row of pixels, for example, one multiplexed data line for each red, green, blue (RGB) color sub-pixel in each pixel in a vertical row of an RGB display integrated touch screen. FIG. 13 shows a "common on top" pixel arrangement for an LCD display that uses a fringe-field switching (FFS) method to a liquid crystal layer. One skilled in the art will recognize that in a common on top arrangement, the pixel electrodes (not shown) will be disposed underneath each common electrode. Thus in a common on top arrangement, the common electrode layer 1305 and the M3 layer 1307 can be disposed closer to the color filter glass than the pixel electrode and the pixel TFT.

Figure 14A:
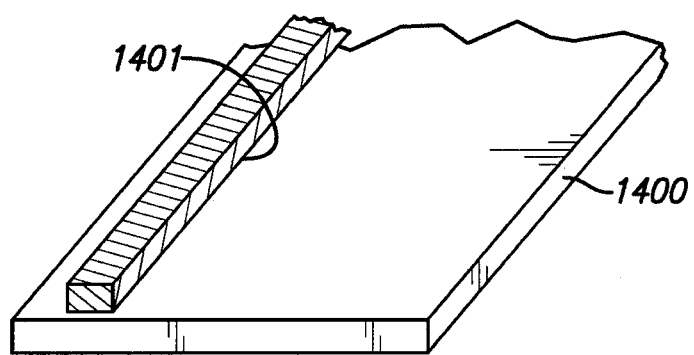
FIGS. 14A and 14B illustrate a close up view of a common electrode with a metal layer disposed on top of it according to some embodiments of the disclosure.
Figure 14B:
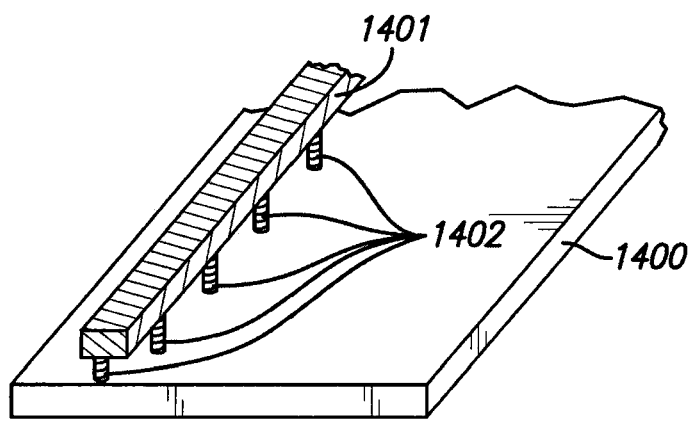

FIGS. 14A and 14B illustrate a close up view of a common electrode with an M3 layer disposed on top of it. In FIG. 14A, the common bus line 1401 is immediately above the common electrode 1400. In FIG. 14B, the common bus line 1401 is above the common electrode 1400, but not immediately above it. Instead, there may be some space between the common electrode and the common bus line. This space may be occupied by another layer, such as a dielectric. Connections 1402 can be used to connect the common electrode to the common bus line instead. The addition of an M3 layer can create a protrusion/step on the common electrode layer. As discussed above, the common electrode layer can be disposed on the top of a TFT layer. Since it is disposed on the top of the TFT active layer, the M3 layer can create a protrusion on the TFT substrate layer.

Figure 15:
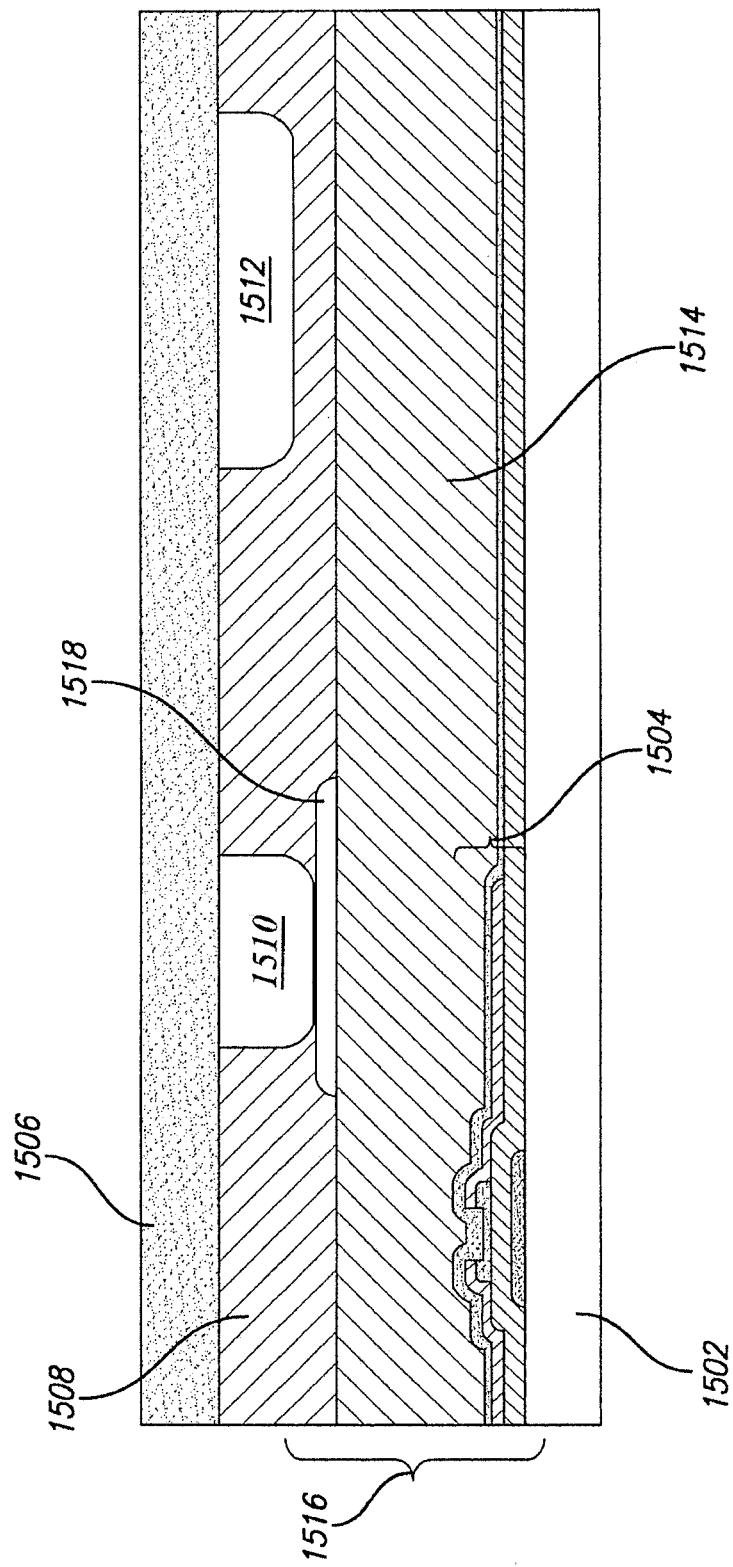
FIG. 15 illustrates an exemplary LCD panel stack up with a column spacer arrangement that takes advantage of the step/protrusion created by a metal layer according to some embodiments of the disclosure.

FIG. 15 illustrates an LCD panel stack up with a column spacer arrangement that takes advantage of the step/protrusion created by an M3 layer. The stackup can contain a TFT glass 1502 which has a TFT substrate 1516 disposed on top of it. TFT substrate can consist of a pixel electrode layer 1504 with a passivation layer 1514 disposed on top it. In a common on top arrangement, common electrode 1508 can be disposed above the passivation layer 1514. An M3 layer 1518 is disposed above the common electrode 1508. As shown in FIG. 15, the M3 layer can cause a protrusion on the TFT substrate layer 1516. A first set of column spacers 1510 can be disposed on top of the M3 layer such that column spacer 1510 rests on top of the column spacer. As discussed above in reference to FIG. 11, when a set of column spacers can be disposed on top of a protrusion or step of a TFT substrate layer, a second set of column spacers whose heights are equal or substantially equal to the first set of column spacers can be disposed on the color filter glass, such that a gap is created that is adequate to allow for the liquid crystal layer to spread out. In this case, the M3 layer 1518 can create the step necessary to allow column spacers 1510 and 1512 to be of the same height, while allowing column spacer 1512 to leave an adequate gap between it and TFT substrate 1516 for the liquid crystal layer to spread out. Furthermore, the step created by M3 layer 1518 can act to prevent scratching of the TFT substrate 1516 when the color filter glass is moved laterally since if the column spacer 1510 becomes misaligned with the step created by the M3 layer, it will not scratch the surface of the TFT substrate because there will be a gap between the spacer and the TFT substrate. This advantage can also be realized in a display that utilizes a protrusion created by a TFT substrate as described in FIG. 11.

Figure 16:
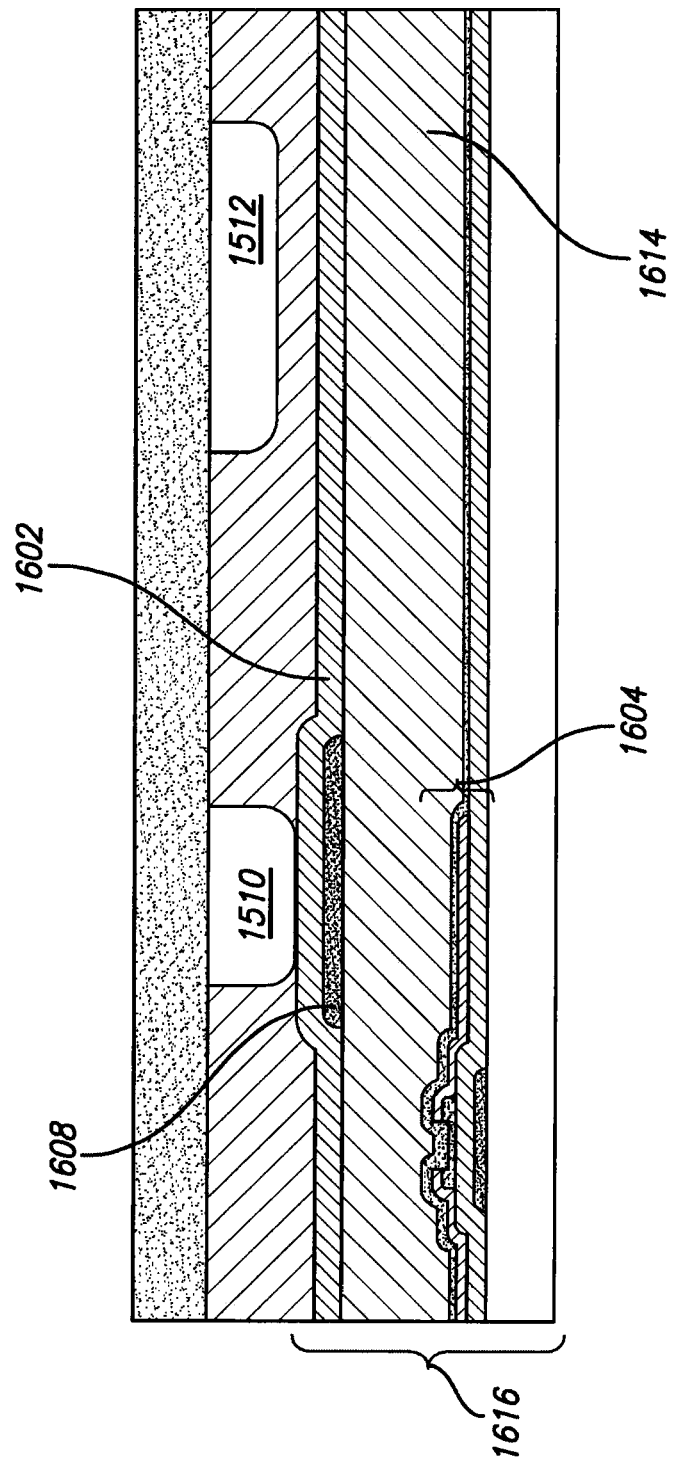
FIG. 16 illustrates another exemplary LCD panel stack up with a column spacer arrangement that takes advantage of the step/protrusion created by a metal layer according to some embodiments of the disclosure.

In some embodiments, a first set of column spacers 1510 does not have to directly contact an M3 layer 1518. As shown in FIG. 16, a dielectric layer 1602 can be disposed over the M3 layer 1518, while still maintaining the step created by the M3 layer.

Figure 17:
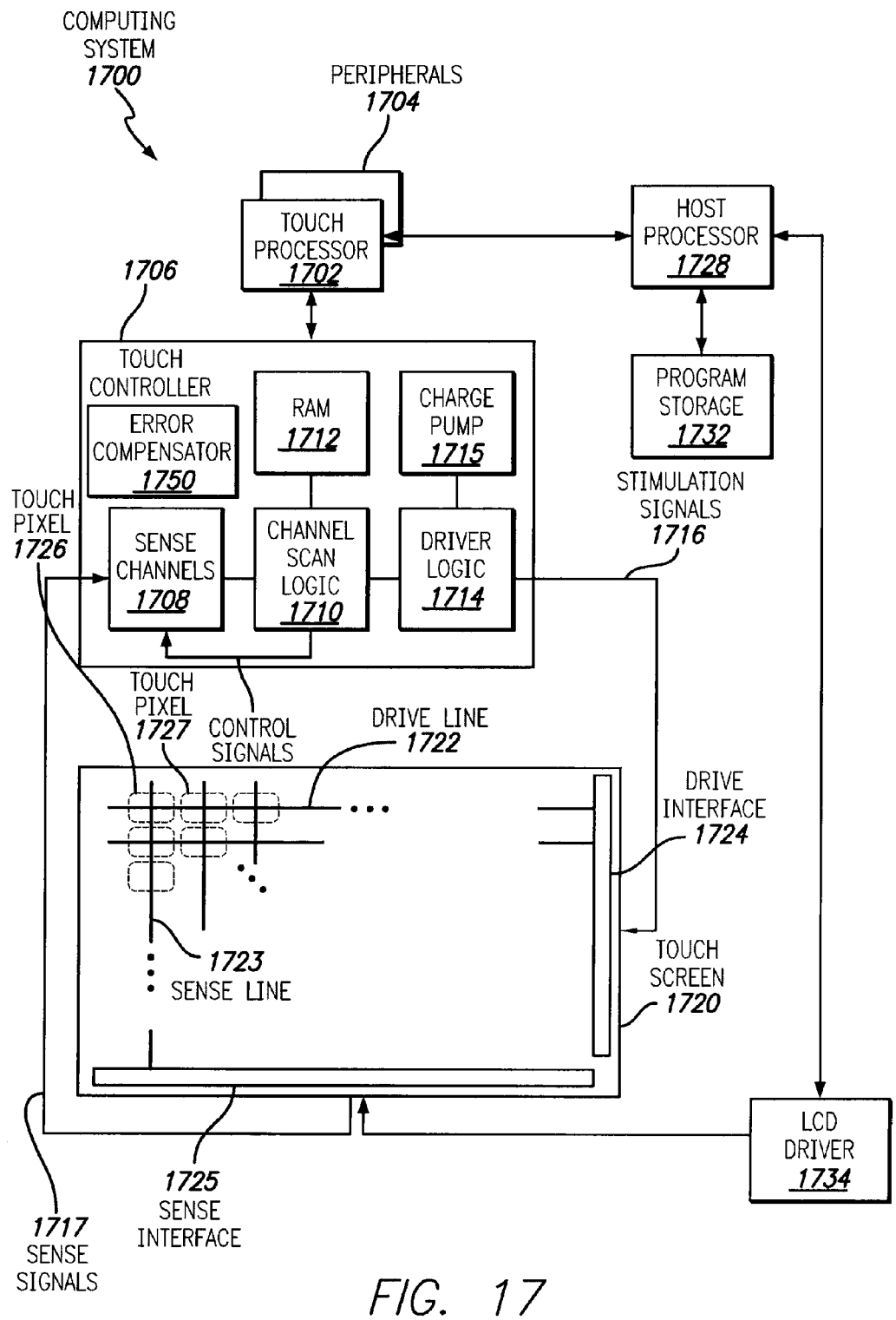
FIG. 17 is a block diagram of an example computing system that illustrates one implementation of an example touch screen according to embodiments of the disclosure.

FIG. 17 is a block diagram of an example computing system 1700 that illustrates one implementation of an example display with the column spacer design described above integrated with a touch screen 1720 according to embodiments of the disclosure. Computing system 1700 could be included in, for example, mobile telephone 136, digital media player 140, personal computer 144, or any mobile or non-mobile computing device that includes a touch screen. Computing system 1700 can include a touch sensing system including one or more touch processors 1702, peripherals 1704, a touch controller 1706, and touch sensing circuitry. Peripherals 1704 can include, but are not limited to, random access memory (RAM) or other types of memory or storage, watchdog timers and the like. Touch controller 1706 can include, but is not limited to, one or more sense channels 1708, channel scan logic 1710 and driver logic 1714. Channel scan logic 1710 can access RAM 1712, autonomously read data from the sense channels and provide control for the sense channels. In addition, channel scan logic 1710 can control driver logic 1714 to generate stimulation signals 1716 at various frequencies and phases that can be selectively applied to drive regions of the touch sensing circuitry of touch screen 1720, as described in more detail below. In some embodiments, touch controller 1706, touch processor 1702 and peripherals 1704 can be integrated into a single application specific integrated circuit (ASIC).

Computing system 1700 can also include a host processor 1728 for receiving outputs from touch processor 1702 and performing actions based on the outputs. For example, host processor 1728 can be connected to program storage 1732 and a display controller, such as an LCD driver 1734. Host processor 1728 can use LCD driver 1734 to generate an image on touch screen 1720, such as an image of a user interface (UI), and can use touch processor 1702 and touch controller 1706 to detect a touch on or near touch screen 1720, such a touch input to the displayed UI. The touch input can be used by computer programs stored in program storage 1732 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 1728 can also perform additional functions that may not be related to touch processing.

Integrated display and touch screen 1720 can include touch sensing circuitry that can include a capacitive sensing medium having a plurality of drive lines 1722 and a plurality of sense lines 1723. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 1722 can be driven by stimulation signals 1716 from driver logic 1714 through a drive interface 1724, and resulting sense signals 1717 generated in sense lines 1723 can be transmitted through a sense interface 1725 to sense channels 1708 (also referred to as an event detection and demodulation circuit) in touch controller 1706. In this way, drive lines and sense lines can be part of the touch sensing circuitry that can interact to form capacitive sensing nodes, which can be thought of as touch picture elements (touch pixels), such as touch pixels 1726 and 1727. This way of understanding can be particularly useful when touch screen 1720 is viewed as capturing an "image" of touch. In other words, after touch controller 1706 has determined whether a touch has been detected at each touch pixel in the touch screen, the pattern of touch pixels in the touch screen at which a touch occurred can be thought of as an "image" of touch (e.g. a pattern of fingers touching the touch screen).

In some example embodiments, touch screen 1720 can be an integrated touch screen in which touch sensing circuit elements of the touch sensing system can be integrated into the display pixels stackups of a display.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

What is claimed is:

1. A display pixel stackup, comprising:
   a top cover;
   a transistor substrate;
   a plurality of common electrodes disposed on the transistor substrate;
   a metal layer in contact with a first common electrode of the plurality of common electrodes, wherein the metal layer forms a protrusion on the transistor substrate;
   a fluid layer disposed between the top cover and the transistor substrate; and
   a plurality of column spacers, wherein a first column spacer of the plurality of column spacers is configured to contact the protrusion on the transistor substrate and directly touches the metal layer,
   wherein the plurality of common electrodes correspond to one or more pixel electrodes for generating an electric field across at least one pixel of the display pixel stackup.

2. The display pixel stackup of claim 1, wherein the transistor substrate is a TFT substrate, and the protrusion of the transistor substrate is created above a pixel TFT of the TFT substrate.

3. The display pixel stackup of claim 1, wherein the first column spacer is disposed on top of a pixel TFT.

4. The display pixel stackup of claim 1, wherein the metal layer forms an electrical connection between at least two of the plurality of common electrodes.

5. The display pixel stackup of claim 1, wherein the plurality of common electrodes are disposed on the transistor substrate in a common on top arrangement.

6. The display pixel stackup of claim 1, wherein the plurality of common electrodes are disposed on the transistor substrate in a common on bottom arrangement.

7. The display pixel stackup of claim 1, wherein the first column spacer directly touches the first common electrode.

8. The display pixel stackup of claim 1, wherein the first column spacer directly touches a dielectric material disposed on top of the metal layer.

9. A method of arranging a plurality of column spacers on a display pixel stackup, the method comprising:
   disposing a plurality of common electrodes on a transistor substrate of the display pixel stackup;
   disposing a metal layer in contact with at least one of the plurality of common electrodes, wherein the metal layer forms a protrusion on the transistor substrate; and
   disposing a first column spacer of the plurality of column spacers such that the first column spacer is configured to contact the protrusion on the transistor substrate and directly touches the metal layer,
   wherein the plurality of common electrodes correspond to one or more pixel electrodes for generating an electric field across at least one pixel of the display pixel stackup.

10. The method of claim 9, wherein the transistor substrate is a TFT substrate, and the protrusion on the TFT substrate is disposed above a pixel TFT on the TFT substrate.

11. The method of claim 9, wherein the protrusion on the transistor substrate is created above a planarized portion of the transistor substrate.

12. The method of claim 9, wherein the metal layer forms an electrical connection between at least two of the plurality of common electrodes.

13. The method of claim 9, wherein the plurality of common electrodes are disposed on the transistor substrate in a common on top arrangement.

14. The method of claim 9, wherein the plurality of common electrodes are disposed on the transistor substrate in a common on bottom arrangement.

15. The method of claim 9, wherein the first column spacer is disposed above the protrusion of the transistor substrate such that the first column spacer directly touches a top edge of the protrusion on the transistor substrate.

16. The method of claim 9, wherein the first column spacer directly touches the first common electrode.

17. The method of claim 9, wherein the first column spacer directly touches a dielectric material disposed on top of the metal layer.

\* \* \* \* \*